United States Patent
Yu et al.

(10) Patent No.: US 10,885,651 B2
(45) Date of Patent: Jan. 5, 2021

(54) INFORMATION PROCESSING METHOD, WEARABLE ELECTRONIC DEVICE, AND PROCESSING APPARATUS AND SYSTEM

(71) Applicant: Tencent Technology (Shenzhen) Company Limited, Shenzhen (CN)

(72) Inventors: Zhixiong Yu, Shenzhen (CN); Zhaopeng Gu, Shenzhen (CN); Yao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 123 days.

(21) Appl. No.: 16/201,734

(22) Filed: Nov. 27, 2018

(65) Prior Publication Data

US 2019/0139246 A1 May 9, 2019

Related U.S. Application Data

(63) Continuation of application No. PCT/CN2017/092823, filed on Jul. 13, 2017.

(30) Foreign Application Priority Data

Jul. 14, 2016 (CN) .......................... 2016 1 0557071
Oct. 19, 2016 (CN) .......................... 2016 1 0911557

(51) Int. Cl.
*G06T 7/00* (2017.01)
*G06T 7/593* (2017.01)
(Continued)

(52) U.S. Cl.
CPC .......... *G06T 7/593* (2017.01); *G02B 27/0075* (2013.01); *G02B 27/0172* (2013.01);
(Continued)

(58) Field of Classification Search
None
See application file for complete search history.

(56) References Cited

U.S. PATENT DOCUMENTS

2013/0038606 A1* 2/2013 Ushiki ................. H04N 13/111
345/419
2015/0348580 A1 12/2015 Van Hoff et al.
(Continued)

FOREIGN PATENT DOCUMENTS

CN 102932657 A 2/2013
CN 103093416 A * 5/2013
(Continued)

OTHER PUBLICATIONS

Tencent Technology, ISRWO, PCT/CN2017/092823, Sep. 30, 2017, 7 pgs.
(Continued)

*Primary Examiner* — Delomia L Gilliard
(74) *Attorney, Agent, or Firm* — Morgan, Lewis & Bockius LLP

(57) ABSTRACT

The various embodiments described herein include an information processing method performed by a wearable electronic device. The wearable electronic device obtains a first initial media file and a second initial media file for a target area. The first initial media file includes a first image acquired based on a first location of the target area. The second initial media file includes a second image acquired based on a second location of the target area. Based on the initial files, the wearable electronic device determines depth information of each target point in the target area. Next, the wearable electronic device selects a first media file from the first and second initial media files, and calculates a second media file. The wearable electronic device then outputs the first and second media files to, respectively, a first output
(Continued)

unit and a second output unit of the wearable electronic device.

20 Claims, 13 Drawing Sheets

(51) Int. Cl.
    *G02B 27/00*     (2006.01)
    *G02B 27/01*     (2006.01)
    *H04N 13/239*     (2018.01)
    *H04N 13/271*     (2018.01)
    *H04N 13/00*     (2018.01)
    *H04N 13/344*     (2018.01)

(52) U.S. Cl.
    CPC ......... *H04N 13/239* (2018.05); *H04N 13/271* (2018.05); *G02B 2027/014* (2013.01); *G02B 2027/0138* (2013.01); *H04N 13/344* (2018.05); *H04N 2013/0081* (2013.01); *H04N 2013/0092* (2013.01)

(56) References Cited

U.S. PATENT DOCUMENTS

2016/0179193 A1*   6/2016   Du .................. G02B 27/017
                                                      345/633
2019/0139246 A1*   5/2019   Yu .................. H04N 13/239

FOREIGN PATENT DOCUMENTS

| CN | 103093416 A | | 5/2013 |
| --- | --- | --- | --- |
| CN | 103605208 A | * | 2/2014 |
| CN | 103605208 A | | 2/2014 |
| CN | 106101685 A | | 11/2016 |
| CN | 106484116 A | | 3/2017 |

OTHER PUBLICATIONS

Tencent Technology, IPRP, PCT/CN2017/092823 , Jan. 15, 2019, 6 pgs.

* cited by examiner

INFORMATION PROCESSING METHOD, WEARABLE ELECTRONIC DEVICE, AND PROCESSING APPARATUS AND SYSTEM

CROSS-REFERENCE AND RELATED APPLICATIONS

This application is a continuation of PCT/CN2017/092823, entitled "INFORMATION PROCESSING METHOD, WEARABLE ELECTRONIC DEVICE, PROCESSING APPARATUS, AND SYSTEM," filed Jul. 13, 2017, which claims priority to (i) Chinese Patent Application No. 201610557071.0 entitled "INFORMATION PROCESSING METHOD, WEARABLE ELECTRONIC DEVICE, PROCESSING APPARATUS, AND SYSTEM," filed with the State Intellectual Property Office of the People's Republic of China on Jul. 14, 2016 and (ii) Chinese Patent Application No. 201610911557.X, filed with the State Intellectual Property Office of the People's Republic of China on Oct. 19, 2016, all of which are incorporated herein by reference in their entirety.

FIELD OF THE TECHNOLOGY

This application relates to the field of communication technologies, and specifically, to an information processing method, a wearable electronic device, a processing apparatus and system, and a non-transitory computer readable storage medium.

BACKGROUND OF THE DISCLOSURE

A head mounted display is an important hardware device in virtual reality (VR) technology. The head mounted display obtains a head orientation of a user in real time, and displays an object in the direction in front of the user. In this process, an object display manner greatly affects a feeling of immersion of a viewer, and a scene viewed by the user by using a VR device needs to be as real as possible.

Panoramic multimedia is a very common VR material, and is obtained by photographing and acquisition by a panoramic camera and image splicing and rendering. A user may turn the head to control movement of a field of view, to generate a particular feeling of immersion. However, usually, panoramic multimedia is two-dimensional (2D), that is, scenes in left and right eyes of the user are totally the same. Consequently, immersive experience of the user is not good.

In addition, there is another solution. Because a three-dimensional (3D) effect is generated by using a parallax, and the parallax is generated by a small difference in location when a stereo camera photographs a same scene. Each monocular camera of a panoramic camera is changed to a stereo camera. During splicing, left-eye cameras of the stereo cameras together form a left panoramic material, and right-eye cameras of the stereo cameras together form a right panoramic material, and then the two panoramic materials are respectively displayed to two eyes, thereby implementing a panorama and achieving a particular 3D visual effect. However, during acquisition, locations of two eyes are limited, discrete, and fixed, when a user turns the head by using a VR device, actual viewpoints of the two eyes are continuously variable. Consequently, parallaxes of the two eyes at some locations may be incorrect.

SUMMARY

This application provides an information processing method, a wearable electronic device, and a processing apparatus and system, to resolve at least the foregoing problem existing in the existing technology.

The technical solutions in this application are implemented as follows:

In accordance with some embodiments, an information processing method is performed at a wearable electronic device having memory and one or more processors, the method including the following operations: obtaining a first initial media file and a second initial media file for a target area, the first initial media file including a first image acquired based on a first location of the target area, and the second initial media file including a second image acquired based on a second location of the target area; determining depth information of each target point in the target area based on the first initial media file and the second initial media file; selecting a first media file from the first initial media file and the second initial media file; calculating a second media file based on the first media file and the determined depth information, the calculated second media file representing an image for the target area that is acquired at a third location of the target area; outputting the first media file to a first output unit of the wearable electronic device; and outputting the calculated second media file to a second output unit of the wearable electronic device In accordance with some embodiments, a wearable electronic device includes one or more processors and memory storing one or more programs (or one or more modules) to be executed by the one or more processors, the one or more modules including instructions for performing any of the methods described herein.

In accordance with some embodiments, a non-transitory computer readable storage medium stores one or more programs. The one or more programs, which when executed by a wearable electronic device, cause the wearable electronic device to perform any of the operations described herein.

DESCRIPTION OF EMBODIMENTS

To make a person skilled in the art understand solutions of this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

It should be noted that, in the specification, the claims, and the accompanying drawings of this application, the terms "first", "second", and the like are intended to distinguish between similar objects but do not necessarily indicate a specific order or sequence. It should be understood that the data used in this way are interchangeable in an appropriate case, so that the embodiments of this application described herein can be implemented in an order other than the order illustrated or described herein. Moreover, the terms "include" and "contain" and any other variants thereof are intended to cover a non-exclusive inclusion. For example, a process, a method, a system, a product, or a device that includes a series of steps or units is not limited to the listed steps or units, but may include other steps or units not expressly listed or inherent to such a process, method, product, or device.

First, some nouns or terms that appear during description of the embodiments of this application are applicable to the following explanations:

GPU: Graphics Processing Unit, a graphics processing unit;

VR: Virtual Reality, virtual reality, a computer simulation system that can create and experience a virtual world, where the system uses a computer to generate a simulated virtual environment, to implement system simulation for an interactive 3D dynamic view with multi-source information fusion and an entity behavior;

rendering: a process of making content into a final effect or an animation; and convergence adjustment: a person to be inspected is instructed to gaze at a target beyond a predetermined distance, which is usually a fingertip of an inspector, and the target is gradually moved to a nasal root of the person to be inspected; in this case, coherence in two eyes of the person to be inspected is observed, which is referred to as convergence reflex.

This application is further described in detail below with reference to the accompanying drawings and specific embodiments.

Figure 1:
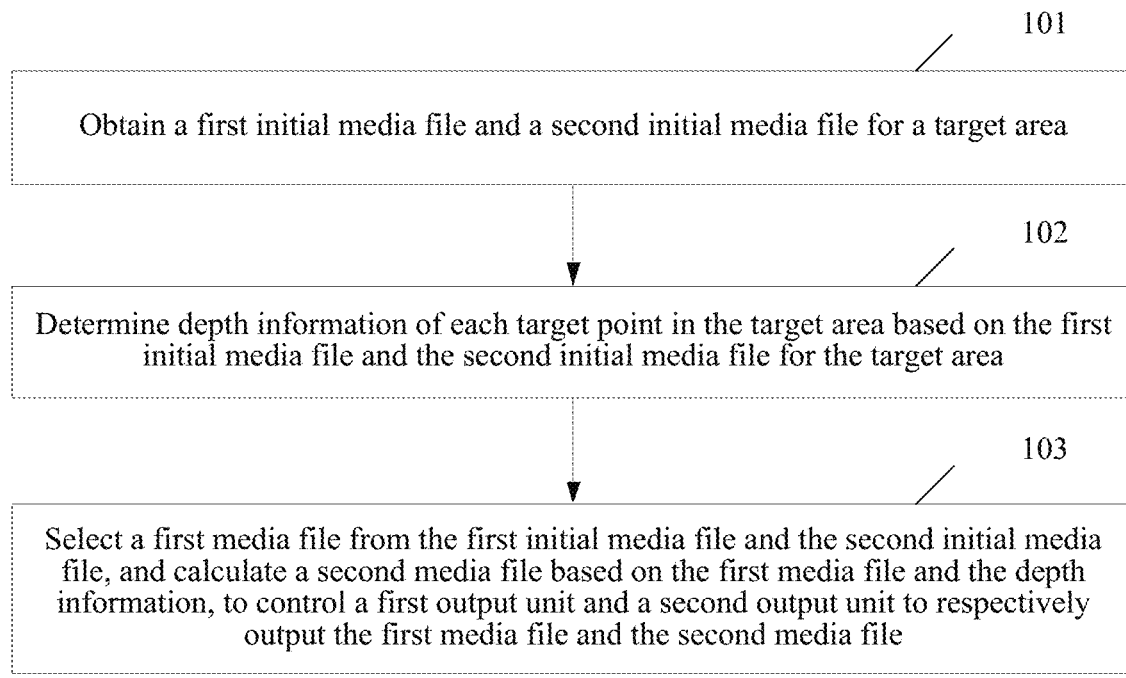
FIG. 1 is a first schematic implementation flowchart of an information processing method according to this application.

An embodiment of this application provides an information processing method. As shown in FIG. 1, the method includes the following steps:

Step 101: Obtain a first initial media file and a second initial media file for a target area, the first initial media file being (e.g., including) an image acquired based on a first location of the target area, and the second initial media file being (e.g., including) an image acquired based on a second location of the target area.

Step 102: Determine depth information of each target point in the target area based on the first initial media file and the second initial media file for the target area.

Step 103: Select a first media file from the first initial media file and the second initial media file, and calculate a second media file based on the first media file and the depth information, to control a first output unit and a second output unit to respectively output the first media file and the second media file, the second media file representing that an image for the target area can be acquired at a third location of the target area.

Figure 2:
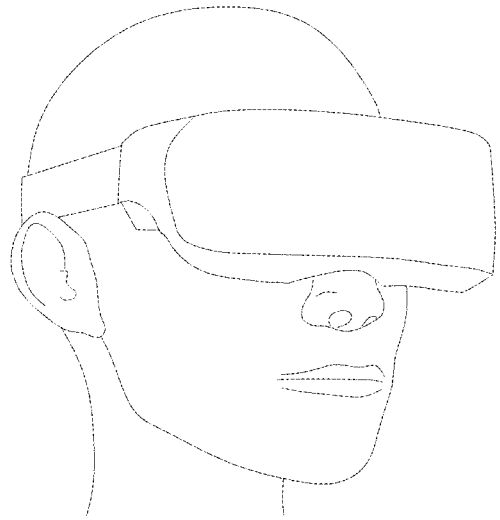
FIG. 2 is a diagram of a use scenario of a wearable electronic device according to this application.

Herein, the method provided in this embodiment may be applied to a wearable electronic device. The wearable electronic device may be smart glasses. For example, referring to FIG. 2, a user may wear smart glasses, and then, processes two initial media files by using the smart glasses.

The two initial media files may be initial media files that are respectively acquired by two image acquisition apparatuses disposed at the first location and the second location of the target area.

Figure 3:
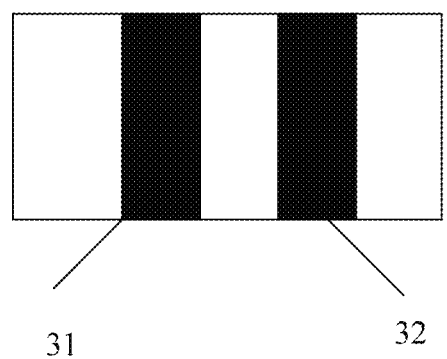
FIG. 3 is a first schematic composition diagram of an image acquisition apparatus according to this application.
Figure 4:
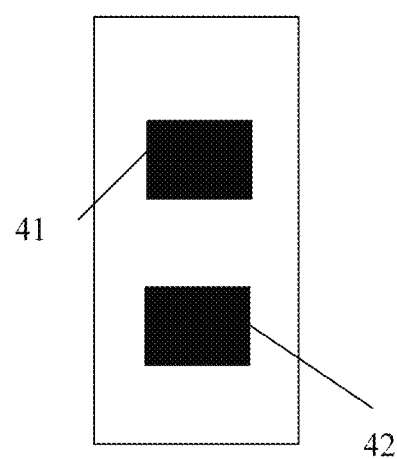
FIG. 4 is a second schematic composition diagram of an image acquisition apparatus according to this application.

For a disposition manner of the two image acquisition apparatuses, refer to FIG. 3 and FIG. 4. In FIG. 3, two image acquisition apparatuses are disposed in one apparatus and are respectively disposed at a first location 31 and a second location 32. In such a scenario, the two locations are adjacent to each other in a same horizontal line. In FIG. 4, two image acquisition apparatuses are disposed in one apparatus and are respectively disposed at a first location 41 and a second location 42. In a scenario shown in FIG. 4, the two locations may be adjacent to each other along a vertical distance.

Acquisition of a target area in FIG. 3 or FIG. 4 may be acquisition of information in a direction. Based on FIG. 3 and FIG. 4, one set of acquisition apparatuses in FIG. 3 or FIG. 4 may be disposed in each of four directions, to perform omni-directional image acquisition. For example, refer to FIG. 5 and FIG. 6. For a device shown in FIG. 5, an entire device is fixed by using a fixing component 51, and then, one set of sub-component including two image acquisition apparatuses is disposed in each of four directions, that is, east, west, south, and north; and the sub-components are respectively sub-components 521, 522, 523 and 524. The two image acquisition apparatuses in each set of sub-component are respectively disposed at a first location and a second location in the respective sub-component. Detailed descriptions are the same as those in FIG. 3, and details are not described herein again. For a device shown in FIG. 6, one set of sub-component including the two image acquisition apparatuses shown in FIG. 4 is disposed in each of four directions, that is, east, west, south, and north, for image acquisition. The two image acquisition apparatuses included in each sub-component are respectively disposed at a first location and a second location. Specific content included in each sub-component is shown in FIG. 4, and details are not described herein again.

Figure 5:
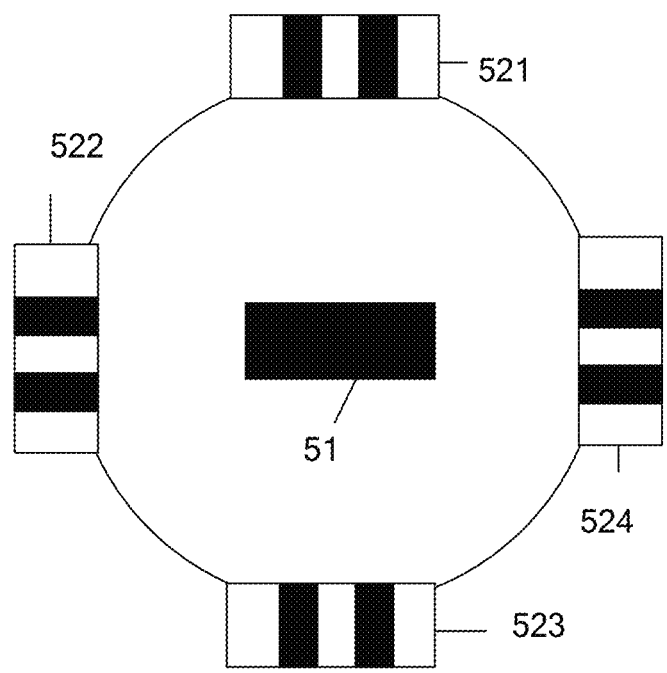
FIG. 5 is a third schematic composition diagram of an image acquisition apparatus according to this application.
Figure 6:
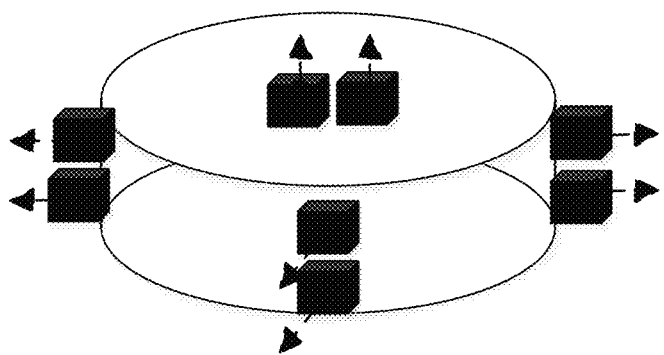
FIG. 6 is a fourth schematic composition diagram of an image acquisition apparatus according to this application.
Figure 7:
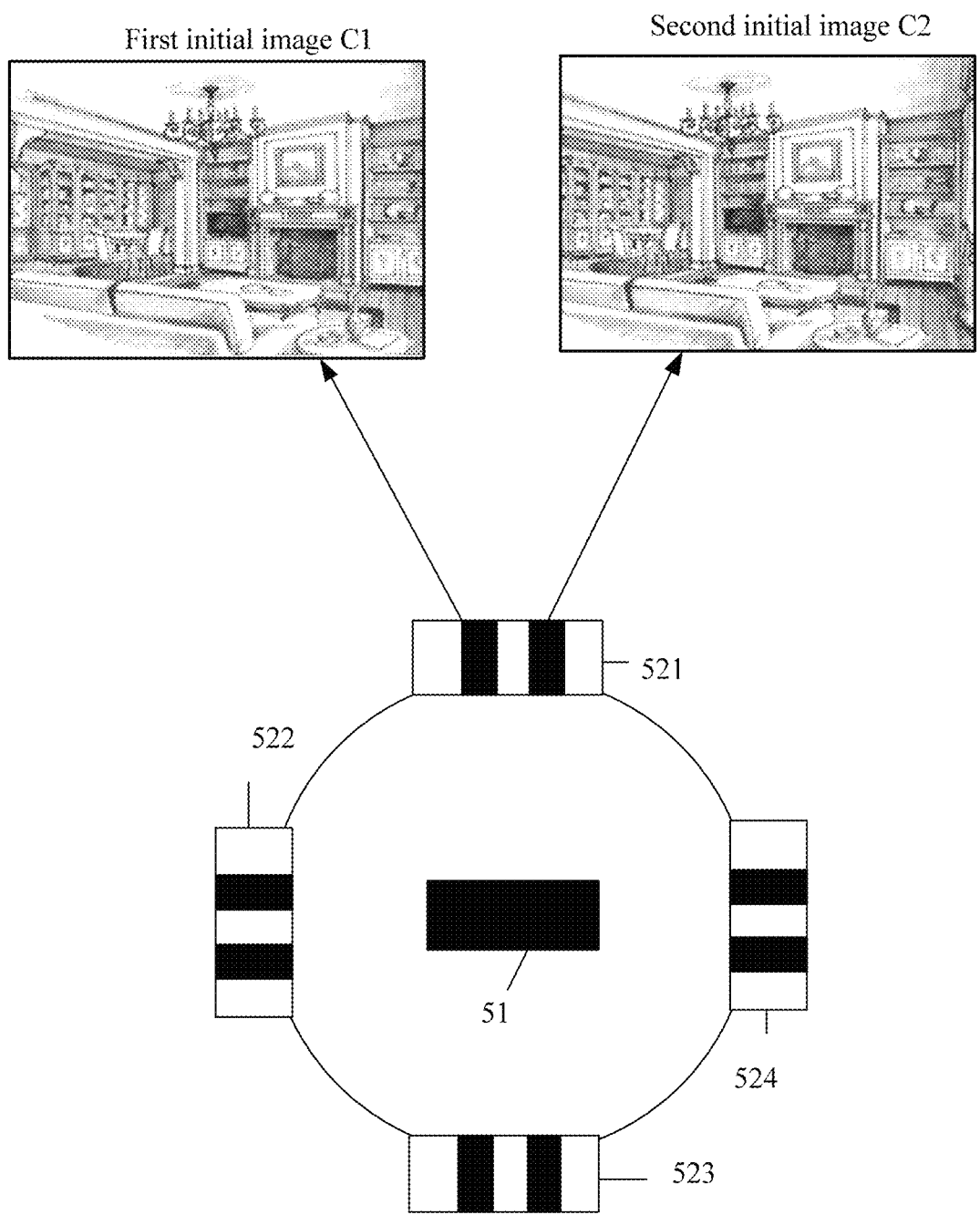
FIG. 7 is a schematic diagram of two initial images according to this application.

An example in which the device shown in FIG. 5 performs image acquisition, and two initial media files acquired by two image acquisition units in the sub-component 521 are selected is used for description. For example, referring to FIG. 7, the two image acquisition apparatuses in the sub-component 521 respectively acquire a first initial media file C1 and a second initial media file C2. In addition, it may be learned from what is shown in FIG. 7 that, for the two initial media files, image acquisition is performed for a same scene, and a same target area is acquired.

Further, because there is a first distance between the two image acquisition apparatuses horizontally, there is a difference between the two initial media files. For example, a partial image at the leftmost of the first initial media file may fail to be acquired at the leftmost of the second initial media file.

It may be understood that, for image acquisition in the foregoing descriptions in this embodiment, acquisition may be performed by using a stereo camera.

In addition, processing in step 101 may be inputting two initial media files acquired by the stereo camera to the wearable electronic device.

The determining depth information of each target point in the target area based on the first initial media file and the second initial media file for the target area includes:

selecting image information of at least one target point in the target area from the first initial media file; and selecting image information of at least one target point in the target area from the second initial media file; and determining, according to the image information that is selected for the at least one target point in the target area from each of the first initial media file and the second initial media file, depth information corresponding to each of the at least one target point.

Image information of a target point may include: pixel information of each pixel included in the target point, and location information of each pixel in an image.

Figure 8:
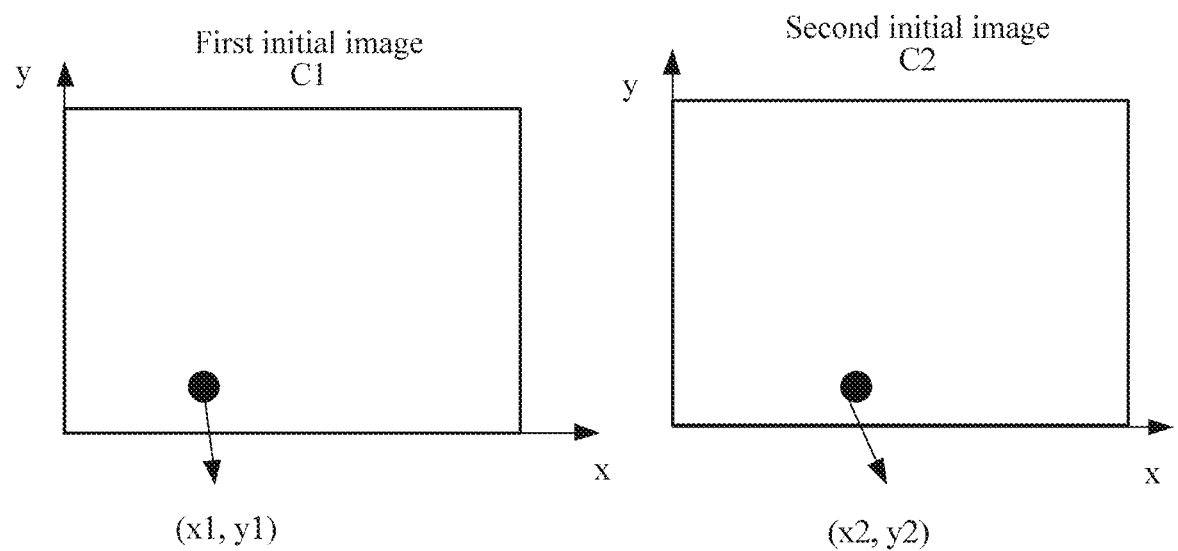
FIG. 8 is a schematic diagram of a selected target point according to this application.

For example, referring to FIG. 8, there is a parallax when a same target point in the target area exists in the two initial media files C2 and C1. Assuming that a coordinate location of a target point in the target area in the first initial media file C1 is C1 (x1, y1), and a coordinate location in the second initial media file C2 is C2 (x2, y2), a difference value between the two coordinates may form a parallax.

The method further includes: obtaining a first distance between the first location and the second location; and correspondingly, the determining depth information of each target point in the target area includes:

calculating the depth information of each target point according to the first distance and image information corresponding to each of the at least one target point corresponding to each of the first initial media file and the second initial media file.

Further, calculation of the depth information is described with reference to the FIG. 9. A component 91 including two image acquisition apparatuses performs image acquisition for a target area C, and especially, performs image acquisition for a target point 92 in the target area C. In imaging areas of the image acquisition apparatuses, two location coordinates (x1, y1) and (x2, y2) corresponding to the target point 92 are obtained. In addition, because a first distance L between the two image acquisition apparatuses and a distance D between a lens of each image acquisition apparatus and the imaging area can be learned in advance, two angles a1 and a2 can be calculated by using L, D and the two location coordinates; and then, depth information H of the target point can be determined based on the two angles and the first distance L.

Figure 9:
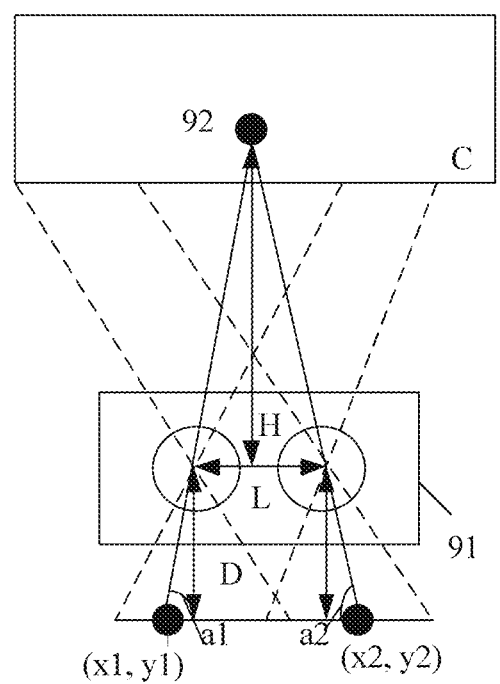
FIG. 9 is a schematic diagram of calculating depth information.

It may be understood that, only a calculation manner for depth information of a target point is provided in FIG. 9. In processing for the two initial media files shown in FIG. 7, the target area may be divided into multiple target points, and then, depth information of each target point is calculated.

The selecting image information of at least one target point in the target area from the first initial media file; and selecting image information of at least one target point in the target area from the second initial media file includes:

dividing the target area into at least one target sub-area, and obtaining a feature parameter corresponding to the at least one target sub-area, where the feature parameter is used to represent complexity of image information included in the target sub-area;

determining, according to the feature parameter corresponding to the target sub-area, a quantity of target points selected for each target sub-area; and selecting image information of at least one target point from each target sub-area in each of the first initial media file and the second initial media file according to the quantity of target points selected for each target sub-area.

Figure 10:
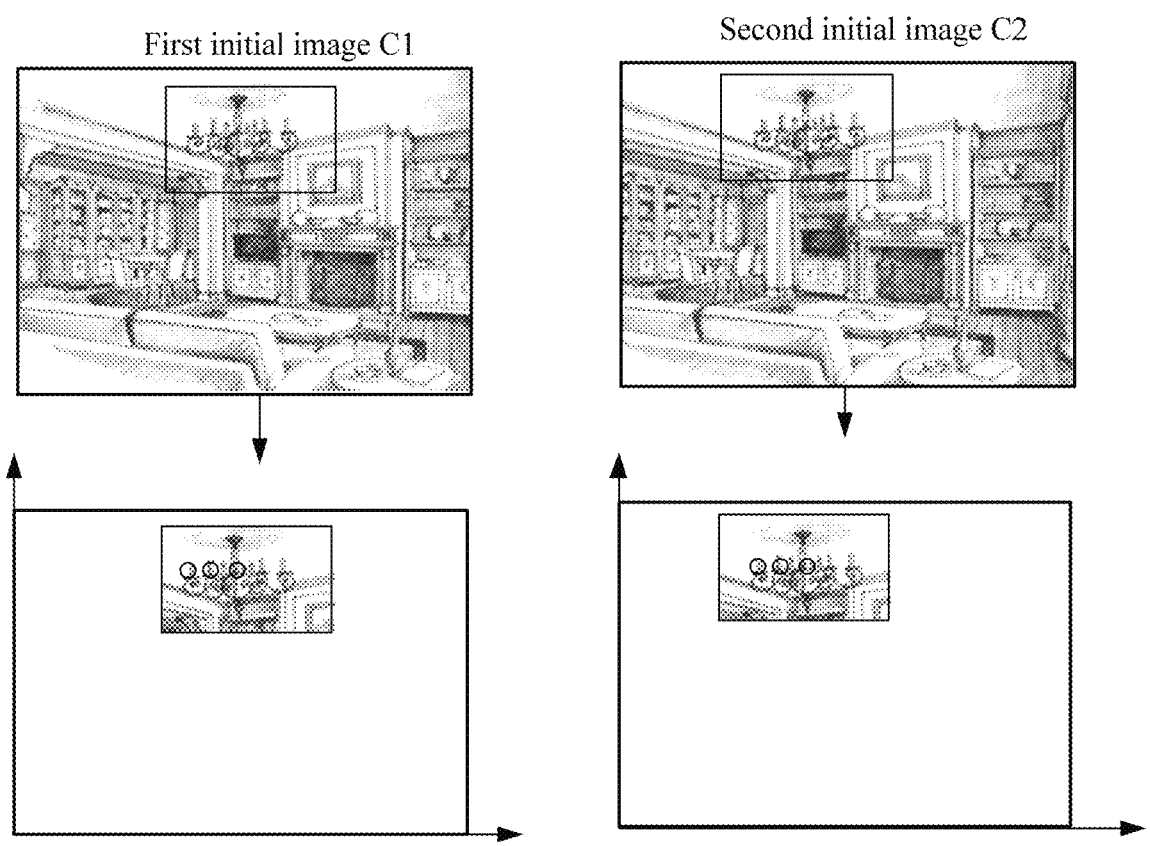
FIG. 10 is a schematic diagram of selecting a sub-area in a target area.

Specifically, the quantity of target points selected for each target sub-area is determined according to the feature parameter corresponding to the target sub-area. A manner of determining multiple target points in the target area may be selecting a target point according to scene richness of the target area. For example, a first quantity of target points are selected from an area with a relatively rich scene. For example, as shown in FIG. 10, assuming that areas determined by squares in two initial media files are areas with relatively rich scenes, three target points may be selected therefrom, and depth information is respectively calculated according to the three target points. It may be understood that, the foregoing descriptions are merely an example. In actual processing, more target points may be selected from a place determined by a square frame in the figure, and a calculation manner for depth information is shown above, and details are not described herein again.

Figure 11:
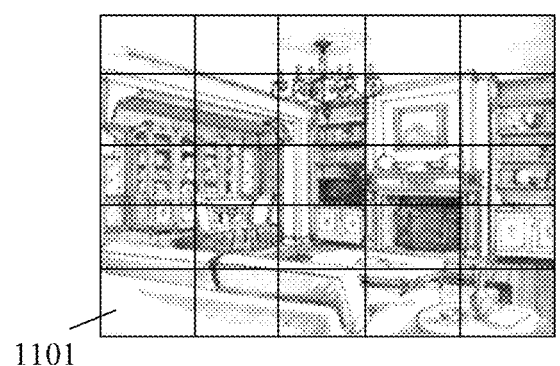
FIG. 11 is a schematic diagram of a scenario of dividing multiple sub-areas according to this application.

In addition, the target area may be equally divided into a first preset quantity of target sub-areas. For example, referring to FIG. 11, the target area is divided into multiple target sub-areas, and each target sub-area may be the same as 1101. In addition, a manner of selecting a target point from each target sub-area may be selecting a second preset quantity of target points from each target sub-area. The second preset quantity may be 3 or higher. A calculation manner for each target point is shown above, and details are not described herein again.

The calculating a second media file based on the first media file and the depth information includes:

obtaining the third location, where the third location is different from an acquisition location corresponding to the first media file; and calculating the second media file according to the acquisition location corresponding to the first media file, the depth information, and the third location.

A triggering condition for calculating the second media file based on the first media file and the depth information may be that an output instruction is obtained, and when the output instruction is detected, the second media file is calculated. For example, when the method is applied to the wearable electronic device, that is, the smart glasses, when a panoramic 3D image is determined to be output, control is performed to start to calculate the second media file.

Further, the acquisition location corresponding to the first media file may be used as a location of a first eye, and correspondingly, the third location may be a location corresponding to a second eye and calculated based on a second distance between two eyes of a target user. Specifically, the second distance may be preset or may be acquired by using the wearable electronic device before the second media file is calculated. A presetting manner may be performing setting by a user according to an actual situation, or may be performing default setting by the wearable electronic device. Details are not described herein.

In addition, for the third location, based on horizontal and vertical coordinates corresponding to the acquisition location of the first media file, the vertical coordinate remains unchanged, and the horizontal coordinate of the acquisition location is increased by the second distance, to obtain the third location. That is, a vertical coordinate of the third location may be the same as the vertical coordinate of the acquisition location of the first media file.

A calculation manner for the calculating the second media file according to at least the first media file, the depth information, and the third location may be opposite to the calculation manner for the depth information, that is, may include: based on a second distance between the acquisition location of the first media file and the third location, and the depth information, for image information of at least one target point in a target area in the first media file, calculating image information corresponding to at least one target point in the corresponding second media file, to form the entire second media file.

In the foregoing processing scenario, the first media file and the second media file may be respectively output to the two eyes of the user, so that the user respectively observes the corresponding media files, to perceive a final image having a 3D effect.

Further, based on the foregoing method embodiment, this embodiment further provides a processing method for a manner of adjusting definitions of specific display areas in the two media files for an area that the user gazes at when the user views the first media file and the second media file.

First, it should be noted that, when a human visual system views objects at different distances, convergence adjustment (when viewing an object nearby, two eyes usually look inward; and when an object far away is viewed, a visual axis is divergent to some extent) and focus adjustment (a crystalline lens is adjusted to focus light to a retina) are performed. In real life, when the human visual system views an object, convergence adjustment and focus adjustment are performed at the same time, and human beings are accustomed to such a manner.

In a VR system, an object viewed by a human is displayed by using a display screen. However, light emitted by the screen has no depth information, and a focus of an eye is fixed on the screen. Consequently, focus adjustment for the eye does not match a feeling of depth of the object, to cause a visual convergence adjustment conflict.

Figure 12:
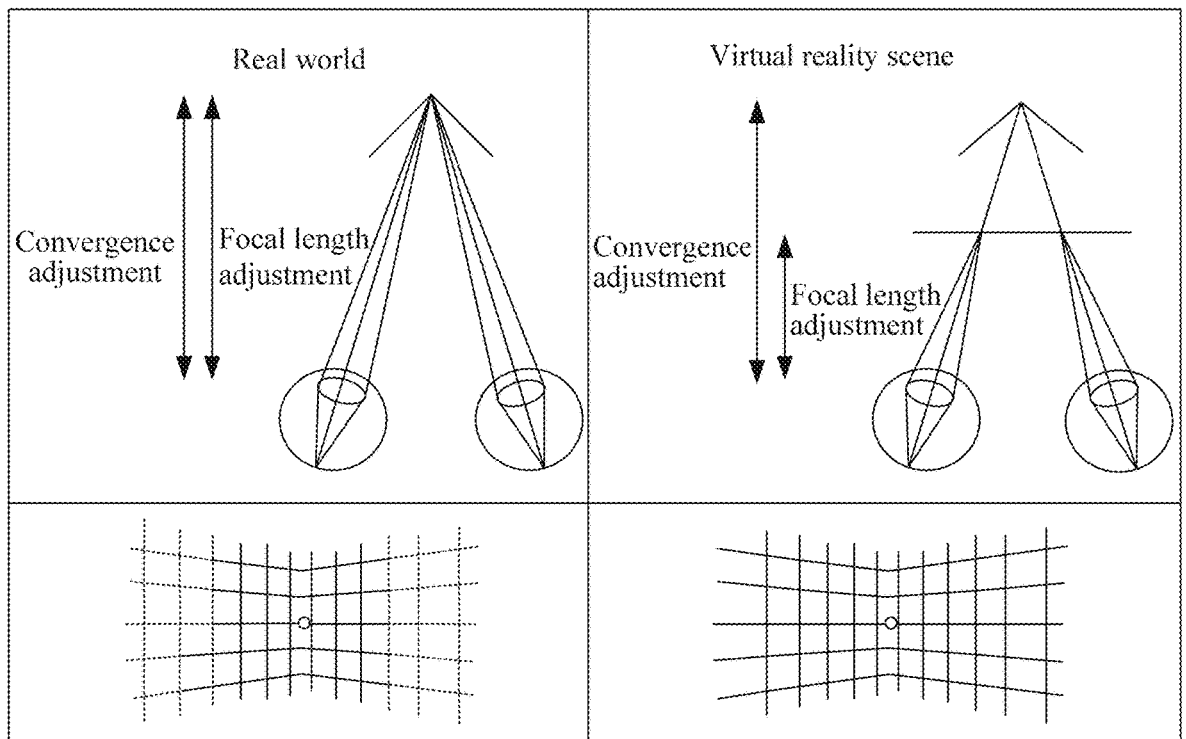
FIG. 12 is a schematic diagram of a principle of convergence adjustment and focus adjustment.

Specifically, as shown in FIG. 12, in the real world, convergence adjustment is consistent with focal length adjustment, and visual feelings when the human visual system views objects of different depths are different. For example, in FIG. 12, a dashed line represents a viewed information module, that is, left and right edges are blurry and the middle is clear. However, in a VR scene, when a human uses a head mounted device to view an object, convergence adjustment is inconsistent with focal length adjustment, visual feelings when the human visual system views objects of different depths are the same, and all data has a same definition. The visual convergence adjustment conflict shown in FIG. 12 violates a human daily physiological law, and causes fatigue and vertigo to the human visual system.

It may be learned from the foregoing analysis that, in an existing VR system, an object viewed by a human is displayed on a flat panel display, and focus adjustment is inconsistent with convergence adjustment, causing a visual convergence adjustment conflict. Consequently, after a VR device is worn, visual fatigue and a vertigo feeling are generated.

Figure 13:
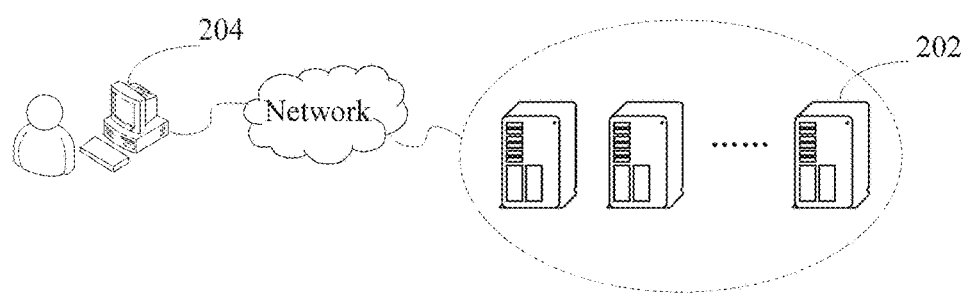
FIG. 13 is a schematic diagram of a hardware environment according to this application.

In some embodiments, the media file processing method may be applied to a hardware environment including a server 202 and a terminal 204 shown in FIG. 13. As shown in FIG. 13, the server 202 is connected to the terminal 204 by using a network. The network includes, but is not limited, to a wide area network, a metropolitan area network, or a local area network. The terminal 204 is not limited to a personal computer (PC), a mobile phone, a tablet computer, or the like. The media file processing method in this embodiment of this application may be performed by the server 202, or may be performed by the terminal 204, or may be performed by the server 202 and the terminal 204. The media file processing method in this embodiment of this application performed by the terminal 204 may be performed by a client installed on the terminal 204.

In some embodiments, the terminal may be a media file display device. The display device may provide a VR scene, and a media file is displayed in the VR scene. The display device may include VR hardware, for example, a VR head mounted display device (head mounted display), a stereo omni-orientational monitor, liquid crystal photic gate glasses, a VR display system, or smart glasses.

The VR head mounted display device is a head mounted 3D display for driving, by using a difference in obtaining information by left and right eyes of a human, a user to generate a feeling of being in a virtual environment. The stereo omni-orientational monitor is a 3D display device coupled to a head. For the liquid crystal photic gate glasses, two images in left and right eyes are respectively generated by a computer, after compositing processing, the images are displayed on corresponding screens by means of time-interleaving.

Figure 14:
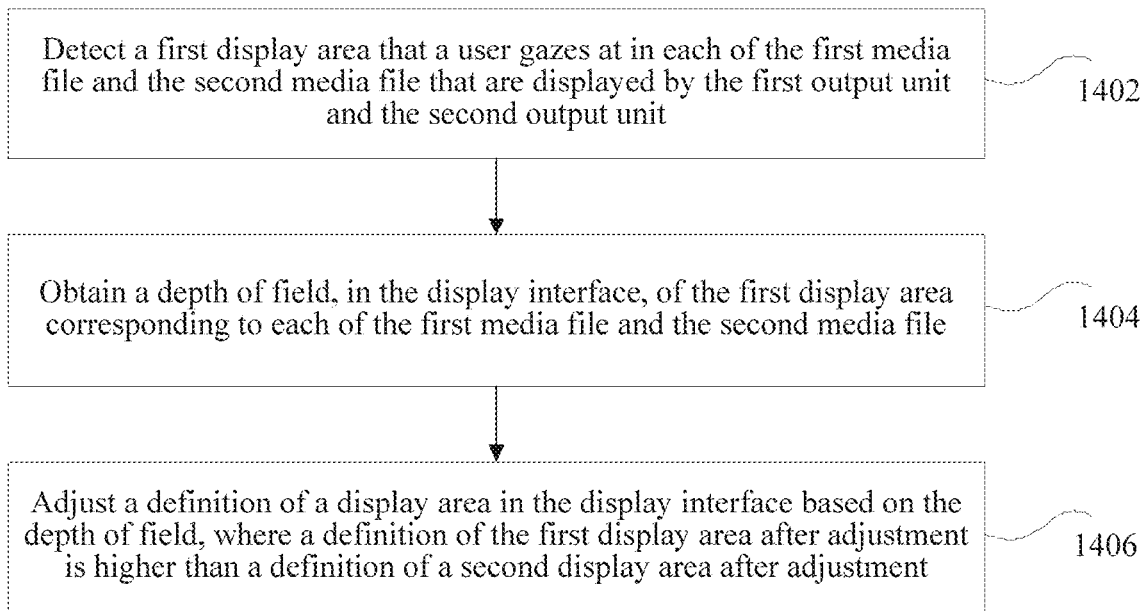
FIG. 14 is a second schematic implementation flowchart of an information processing method according to this application.

Based on FIG. 1, as shown in FIG. 14, a method for adjusting definitions of different display areas further with reference to a gazing point may include the following steps:

Step 1402: Detect a first display area that a user gazes at in each of the first media file and the second media file that are displayed by the first output unit and the second output unit, where the first media file and the second media file are displayed in a VR scene, and the first output unit and the second output unit are configured to provide the VR scene.

Step 1404: Obtain a depth of field, in the display interface, of the first display area corresponding to each of the first media file and the second media file.

Step 1406: Adjust a definition of a display area in the display interface based on the depth of field, where a definition of the first display area after adjustment is higher than a definition of a second display area after adjustment, and the second display area is all or some of areas other than the first display area in the display interface.

By means of step 1402 to step 1406, after the first display area (that is, when two eyes of the user respectively gaze at the first media file and the second media file, there are corresponding gazing areas, that is, the first display area corresponding to each media file) that the user gazes at in each of the display interfaces of the media files is detected, based on the depth of field of each first display area in the display interface, the definition of the media file in the display area is adjusted, so that the definition of each first display area after adjustment is higher than the definitions of all other or some areas.

In the foregoing embodiment, definitions of the display interfaces of the first media file and the second media file are adjusted by using depths of field of the areas that the user gazes at, so that definitions of different display areas in the display interface are different, and information displayed in the display interface includes information about the depth of field. In this way, when a focus of a visual system of the user is fixed on a screen of a display device (that is, the first output unit and the second output unit), eye focus adjustment matches the depth information in the information in the display interfaces, and convergence adjustment and focus adjustment are performed at the same time, thereby eliminating a convergence adjustment conflict, and resolving a technical problem of a visual convergence adjustment conflict.

In the foregoing embodiment, the definitions of the files viewed by the visual system are different, so that the convergence adjustment conflict is eliminated, that is, when a media file is viewed in a VR scene provided by the display device, focus adjustment and convergence adjustment are performed at the same time, thereby preventing the user from generating visual fatigue and a vertigo feeling.

The display device in this embodiment of this application may be a head mounted display device. In a technical solution provided in step 1402, the display device is configured to provide the VR scene, and the user (that is, a person who uses the display device) may operate an operation interface in the VR scene to start to play the media file. After the media file starts to be played, the first display area that the user gazes at in the display interface of the media file is detected. In some embodiments, after the display device is enabled, an image acquisition device may be enabled. The image acquisition device is used to acquire movement information of the visual system of the user of the display device, and the first display area is determined by using the acquired movement information of the visual system. The first display area may include one or more pixels. The image acquisition device includes a camera. It should be understood that, in this embodiment, a camera may be disposed at each of locations of the two eyes of the user, that is, there are two cameras.

The image acquisition device may be used to acquire the movement information of the visual system of the user of the display device by means of eyeball tracking. By means of the technology, the user can operate the screen without touching the screen (the screen may be a screen in the VR scene).

When eyes of a human look in different directions, there are small changes in the eyes, and these changes cause features that can be extracted. These features may be extracted by means of image capturing or scanning, to track changes in the eyes. Based on the changes in the eyes, a status and a requirement of the user are predicted and responded to, to achieve an objective of controlling the device by using the eyes.

Eyeball tracking may be implemented by at least one of the following: tracking according to changes in a feature of an eyeball and a feature of a place around the eyeball, tracking according to a change in an iris angle, or extracting a feature by transmitting an infrared light beam to an iris.

In a technical solution provided in step 1404, after the first display area that the user gazes at in each of the playing interfaces of the first media file and the second media file is detected, the depth of field, in the display interface of the media file, of the first display area may be obtained.

The depth of field is a distance range between photographed objects measured for imaging when a front edge of a camera lens or another imager can obtain a clear image. After focusing is done, a clear image can be formed within a range around a focus, and the distance range is the depth of field. After the image is obtained, a depth of field of the image may be determined based on a circle of confusion. Around the focus, light rays are gathered and diffused, a point is imaged as a circle to a focus, and then changes to a circle by means of diffusion. Circles around the focus are referred to as circles of confusion.

In the foregoing embodiment, a depth of field of each display area in each of the display interfaces of the first media file and the second media file may be obtained in advance, and after the first display area that the user gazes at in the playing interface of the media file is detected, the depth of field, in the display interface of the media file, of the first display area is directly read from the obtained depth of field. Alternatively, after the first display area that the user gazes at in each of the playing interfaces respectively corresponding to the first media file and the second media file is detected, the depth of field, in the display interface of the media file, of each display area is determined, and the depth of field of each of the first display areas respectively corresponding to the first media file and the second media file is obtained.

According to the foregoing embodiment of this application, before the depth of field, in the display interface of the media file, of the first display area is obtained, a parallax when the user uses the display device to view the media file may be determined. The depth of field of each display area in the display interface of the media file may be calculated by using the parallax; and the depth of field of each display area is stored, to obtain a depth of field file of the media file. The obtaining the depth of field of the display area in the media file includes: reading the depth of field of the first display area from the depth of field file.

In an application scenario of VR, there is a parallax for a 3D file viewed by left and right eyes of a human visual system, a depth of field of each display area in each of the display interfaces respectively corresponding to the first media file and the second media file that are viewed by the left eye is obtained. For example, a depth of field of each display area in each of the display interfaces of the media files that are viewed by the right eye may be obtained. A depth of field of each display area in each of the display interfaces respectively corresponding to the first media file and the second media file is calculated by using a parallax when the left and right eyes of the human use the display device. Further, a depth of field of each pixel may be recorded. Data of the obtained depth of field is stored, to obtain a depth of field file corresponding to the right eye.

Correspondingly, a same method may be further used to obtain a depth of field file corresponding to the left eye.

After the first display area is detected, the depth of field of each of the corresponding first display areas in the first media file and the second media file may be rapidly determined by using the depth of field files. For example, an average value of the depths of field of all the pixels in the first display area may be used as the depth of field of the first display area; a maximum value of the depths of field of the pixels in the first display area may be used as the depth of field of the first display area; a minimum value of the depths of field of the pixels in the first display area may be used as the depth of field of the first display area; or a weighted average value of the pixels of the first display area may be used as the depth of field of the first display area.

In a technical solution provided in step 1406, the definition of each display area in the display interface of the media file may be adjusted based on the depth of field, in the display interface of the media file, of the first display area, to adjust the definition of the first display area to be the highest, and adjust a definition of another display area to be lower than the definition of the first display area. For example, the definition of the another display area may be adjusted to be relatively high or relatively low.

In some embodiments, all areas other than the first display area in the display interface of the media file may be determined as the second display area; or some areas other than the first display area in the display interface of the media file may be determined as the second display area. For example, the first display area after adjustment is a display area having the highest definition in the display interface of the entire media file, but the display interface of the media file after adjustment may further include another display area having a same definition as the first display area.

In some embodiments, the adjusting a definition of a display area in the display interface based on the depth of field may include: determining, in each of the display interfaces respectively corresponding to the first media file and the second media file, a display area having a depth of field different from the depth of field of each first display area, as the second display area; and setting a definition of the second display area in each of the display interfaces respectively corresponding to the first media file and the second media file to be lower than the definition of the first display area.

The depth of field of each display area in each of the display interfaces respectively corresponding to the first media file and the second media file is obtained. Herein, each display area may be determined based on an object (or a substance) displayed in the display interface of the media file, or may be determined based on whether depths of field in the display interface are the same. For example, pixels, in the display interface, belonging to a same displayed object form a display area, or a run-through area formed by pixels having a same depth of field in the display interface is a display area. In some embodiments, multiple discrete points may be disposed. Centered on each discrete point, a point whose distance to the same center is less than a predetermined distance is determined as a point belonging to a same display area.

Certainly, there may be another display area determining method. This is not limited in this application.

In this embodiment, a definition of another area having a depth of field different from the depth of field of the first display area may be set to be lower than the definition of the first display area.

Specifically, the setting the definition of the second display area in the display interface to be lower than the definition of the first display area may include: obtaining a depth of field of each display sub-area in the second display area; determining a depth difference between the depth of field of each display sub-area in the second display area and the depth of field of the first display area; and setting definitions of different display sub-areas according to the depth difference, where a larger depth difference corresponding to a display sub-area indicates a lower definition to be set for the display sub-area.

By means of this embodiment, information about a media file with a depth may be obtained, and when a user views the information, there is no visual convergence conflict, and fatigue is prevented.

In this embodiment, an average value of depths of field of all pixels in the display sub-area may be used as the depth of field of the display sub-area; a maximum value of depths of field of pixels in the display sub-area may be used as the depth of field of the display sub-area; a minimum value of depths of field of pixels in the display sub-area may be used as the depth of field of the display sub-area; or a weighted average value of pixels in the display sub-area may be used as the depth of field of the display sub-area. This is not limited in this application.

In this embodiment, the definition of each of the second display areas may be set to be lower than the definition of the first display area; and a definition of each display sub-area in the second display area may be set to a same definition; or definitions of the display sub-areas in the second display area may be set to different definitions.

A definition of an area that is in the second display area and whose depth of field has a relatively large depth difference from the depth of field of the first display area may be set to a lower definition, and an area that is in the second display area and whose depth of field has a relatively small depth difference from the depth of field of the first display area may be set to a higher definition.

Figure 15:
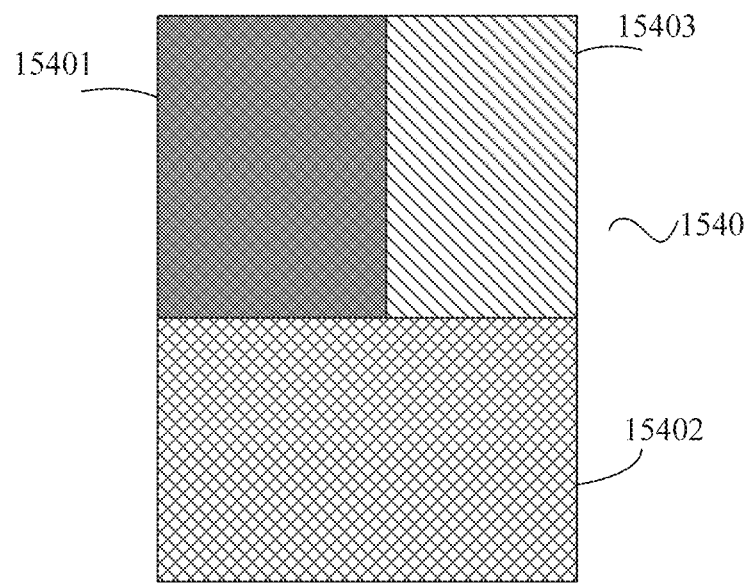
FIG. 15 is a first schematic diagram of an interface according to this application.

Herein, "lower" and "higher" are described for the display sub-areas in the second display area. As shown in FIG. 15, in the figure, a density of lines filled in a shadow is used to indicate a definition, and a higher density of lines filled in a shadow indicates a higher definition.

A display interface 1540 of a media file in FIG. 15 includes three areas, where a first area 15401 is a first display area, that is, a detected area that a user gazes at in a display interface of the media file, a second area 15402 is a first display sub-area in a second display area, a difference between depths of field of the display sub-area and the first display area is A, a third area 15403 is a second display sub-area in the second display area, and a difference between depths of field of the display sub-area and the first display area is B. Assuming that A>B, a definition of the first display sub-area may be set to be relatively low, and a definition of the second display sub-area may be set to be relatively high. However, the definitions of the first display sub-area and the second display sub-area may be both lower than that of the first display area. Therefore, the definition of the first display area is higher than the definition of the second display sub-area, and the definition of the second display sub-area is higher than the definition of the first display sub-area.

Certainly, the embodiment shown in FIG. 15 is merely an example for description. In specific implementation, shapes of a display area and a display sub-area may be irregular shapes, and this is not limited in this application; and a quantity of display sub-areas into which the second display area may be divided is not limited in this application either.

In some embodiments, the setting the definition of the second display area in the display interface to be lower than the definition of the first display area may include: gradually lowering definitions of display sub-areas that are centered on the first display area, in a predetermined radiation path, and in the second display area, where the predetermined radiation path is a radiation path far away from the first display area. By means of this embodiment, definitions of display areas are selectively lowered, thereby ensuring that an amount of data to be processed is reduced when the user views the file.

Figure 16:
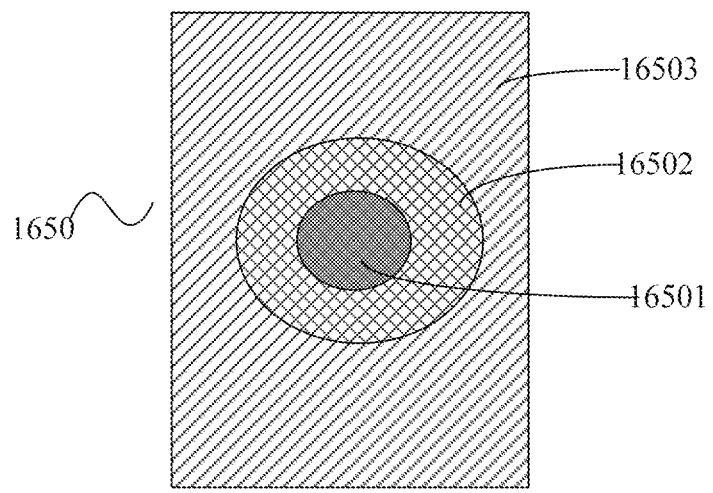
FIG. 16 is a second schematic diagram of an interface according to this application.

Specifically, a definition may be set according to a distance to the first display area. For example, centered on or based on the first display area, a second display area located outside the first display area and surrounding the first display area is divided along the predetermined radiation path. As shown in FIG. 16, the second display area may include the first display sub-area and the second display sub-area. Certainly, in specific implementation, the second display area may include more display sub-areas. Only the first display sub-area and the second display sub-area are used as an example for description in this application.

In a display interface 1650 of a media file shown in FIG. 16, a first display sub-area 16502 has a shorter distance to a first display area 16501 (compared with a second display sub-area), and a definition of the first display sub-area is set to be higher; and a second display sub-area 16503 has a longer distance to the first display area (compared with the first display sub-area), and a definition of the second display sub-area is set to be lower. In FIG. 16, a density of lines filled in a shadow is used to represent a definition, and a higher density of lines filled in a shadow indicates a higher definition.

In some embodiments, when a distance between a sub-display area and the first display area is determined, a Euclidean distance between the display sub-area and the first display area may be calculated for determining.

In some embodiments, the adjusting a definition of a display area in the display interface based on the depth of field may include: obtaining a third display area that is in the display interface of the media file and that has a same depth of field as the first display area; and setting definitions of some or all of areas in the third display area in the display interface to the definition of the first display area.

Specifically, the setting definitions of some or all of areas in the third display area in the display interface to the definition of the first display area may include: setting a definition of a display sub-area that is in the third display area and whose distance to the first display area exceeds a predetermined distance to be lower than the definition of the first display area.

According to the foregoing embodiment, an area that is in the display interface of the media file and that has the same depth of field as the first display area may be determined as the third display area, and the definitions of all or some of the areas in the third display area may be set to the definition the same as the definition of the first display area.

In some embodiments, a definition may be set according to a distance to the first display area. For example, centered on or based on the first display area, the third display area is divided along a predetermined radiation path, a pixel whose distance to the first display area is within a predetermined distance is classified as a pixel in a first display sub-area, and a definition of a first display sub-area in the third display area may be set to the definition the same as the definition of the first display area.

A pixel whose distance to the first display area is beyond the predetermined distance is classified as a pixel in a second display sub-area, and a definition of a second display sub-area in the third display area may be set to be lower than the definition of the first display area.

Further, in some embodiments, definitions of display blocks in the second display sub-area may also be set to be different. For example, along the predetermined radiation path, a definition of a display block that is in the second display sub-area and that has a longer distance to the first display area is set to be lower, and a definition of a display block that is in the second display sub-area and that has a shorter distance to the first display area is set to be higher.

In the foregoing embodiment, the adjusting a definition of a display area in the display interface based on the depth of field may include: adjusting a display resolution of the display area in the display interface based on the depth of field.

Specifically, the definition of the display area may be adjusted by adjusting the display resolution of the display area. For example, if the resolution is adjusted to be higher, the corresponding definition is higher; or if the resolution is adjusted to be lower, the corresponding definition is lower.

In some embodiments, the definition of the display area may be adjusted by using a Gaussian blur processing manner. For example, if a blur parameter is set to be higher, the corresponding definition of the display area is lower; or if a blur parameter is set to be lower, the corresponding definition of the display area is higher.

In some embodiments, the definition of the display area may be adjusted by adjusting quantities of grids on different interfaces of the media file. For example, if a quantity of information grids in the display interface of the media file is adjusted to be higher, the definition of the display area is adjusted to be higher; or if a quantity of information grids in the display interface of the media file is adjusted to be lower, the definition of the display area is adjusted to be lower.

Certainly, the definition of the display area may be further adjusted by using another processing manner for definition adjustment. This is not limited in this application.

According to this embodiment of this application, the detecting a first display area that a user of the display device gazes at in a display interface of the media file may include: detecting a gazing point of the user in the display interface of the media file; and obtaining a field of view range of the gazing point in the display interface corresponding to the media file, and determining the field of view range as the first display area.

The gazing point of the user in the display interface of the media file may be detected according to the foregoing eyeball tracking technology. The gazing point may be a pixel in the display interface corresponding to the media file. When a human eye gazes at a location, there is an angle for a field of view. Based on the angle, the field of view range for gazing by the user may be determined, and the range is determined as the first display area. The first display area may include one or more pixels.

It should be noted that, the media file in the foregoing embodiment may include a static file such as an image, or may be a dynamic file, for example, a file such as an animation or a video.

This application further provides a preferred embodiment. The preferred embodiment of this application is described in detail below with reference to FIG. 17 and FIG. 18. By means of this embodiment, a file may be actively rendered according to a depth of field.

The solution may be applied to a VR helmet. Specifically, a user may wear the VR helmet, and the user may operate the VR helmet by using a handle or by means of eyeball movement.

When the VR helmet is operated by means of eyeball movement, a gazing point of a human eye on a screen (the screen is a virtual screen of the VR helmet) may be determined by using the eyeball tracking technology, and the gazing point may be one or more pixels. Further, it should be noted that, a gazing point of the user, that is, a user may exist in each of two screens (output units).

Figure 17:
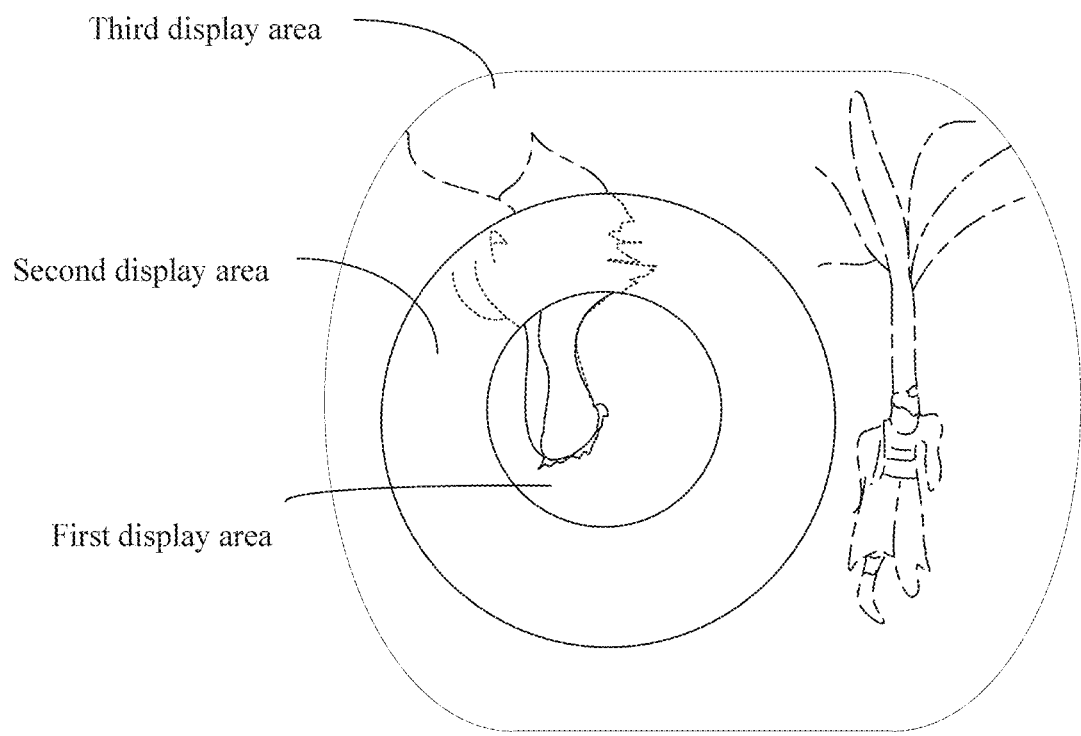
FIG. 17 is a third schematic diagram of an interface according to this application.

When a human eye gazes at a location, there is a predetermined angle, for example, 60 degrees, for an effective and comfortable field of view, and the human eye is insensitive to an object beyond a range of the predetermined angle. Whether such a scene is rendered to be clear does not affect a subjective feeling for a human vision. Therefore, rendering tasks of a GPU can be reduced by using such a feature, as shown in FIG. 17. A length of a line segment in a dashed line in FIG. 17 is used to represent a definition, a larger length of a line segment indicates lower definition, and a definition represented by a solid line is higher than a definition represented by a dashed line.

As shown in FIG. 17, this embodiment includes display areas of three definitions, a definition of a first display area is the highest, a definition of a second display area is the second highest, and a definition of a third display area is the lowest. The first display area includes a gazing point, that is, a definition of a display area in which the gazing point is located is set to be the highest. Definitions of other areas are set to be lower. In this way, a calculation amount can be reduced.

It may be learned from FIG. 17 that, in such a manner, a location of a gazing point of a human eye is considered, and objects around the location are all rendered according to a same definition.

Specifically, in the embodiment shown in FIG. 17, a media file may be rendered based on a gazing point. In the solution, how to reduce a calculation amount of the GPU may be considered from the perspective of a 2D plane. A level of an area is divided according to a Euclidean distance to the gazing point. An area far away from the gazing point may be rendered by using a lower resolution, to lower a definition, so that different definitions may be displayed in one display interface.

In this embodiment, a resolution of an area invisible to the human eye or not around the gazing point of the human eye is lowered for rendering, because the human eye is insensitive to these areas or likewise, things viewed from the corner of the human eye are relatively blurry. In this way, viewing by the user is not affected, and an amount of data to be processed can be reduced.

Figure 18:
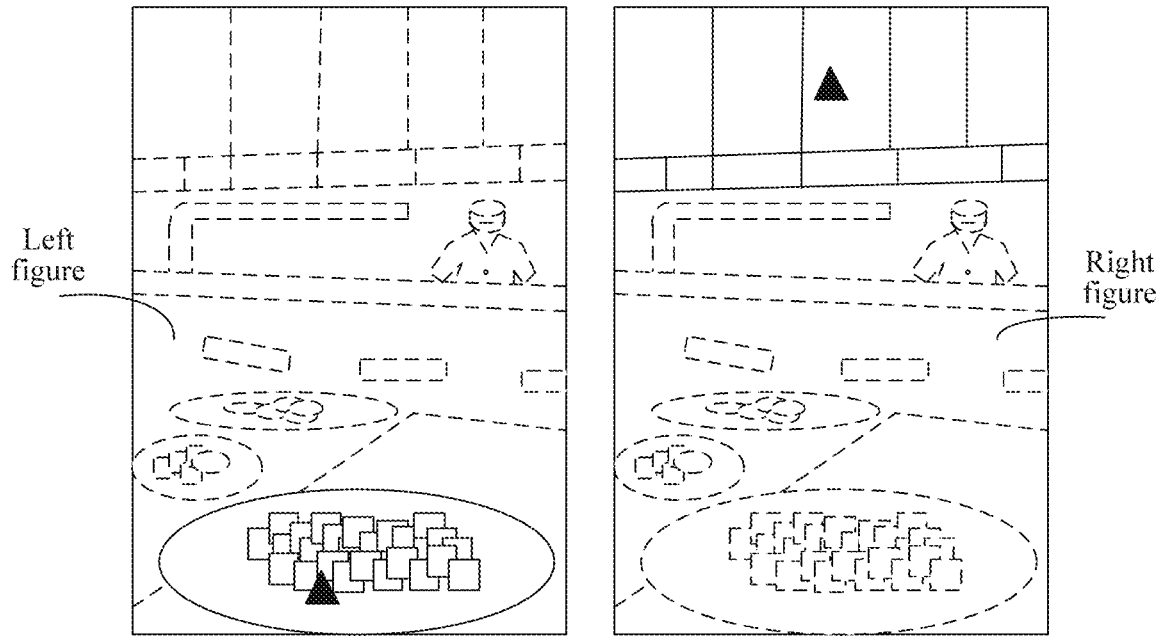
FIG. 18 is a fourth schematic diagram of an interface according to this application.

In some embodiments, the definition of the display interface of the media file may be adjusted according to a depth of field of the gazing point of the user. As shown in FIG. 18, when a human focuses on a scene (which may be a display area), blur processing may be performed for a depth of another scene based on a depth of the scene.

As shown in FIG. 18, a small black triangle represents a visual focus. A visual focus in the left figure is near, and a visual focus in the right figure is far away. For different focal lengths in a same scene, there is a difference between processed display areas, but a common point is that definitions of areas focused by eyes are all very high. In the figure, a definition represented by a dashed line is lower than definition represented by a solid line.

Specifically, in a solution shown in FIG. 18, rendering is performed based on a depth of field. Considered from the perspective of 3D space, depth information is used, sharpening processing is performed for a depth of field corresponding to the gazing point, and blur processing is performed for another depth of field. The solution can relieve discomfort caused by the visual convergence adjustment conflict.

By means of the foregoing embodiment, content in a visual scene is displayed in a different manner as the depth of field of the gazing point (the depth of field corresponds to the focus) varies, so that discomfort caused by the visual convergence adjustment conflict can be relieved to some extent.

Left and right eyes in the VR system have independent file content (such as video content), and depth maps corresponding to objects may be calculated according to the video content in the left and right eyes. Specifically, a depth map of an entire scene may be calculated by using a parallax of left and right eyes of a head mounted device. After a depth of an object at the gazing point is learned, the object corresponding to the depth of field may be sharpened, and an object of another depth of field is blurred, to achieve an effect in FIG. 18.

Rendering is performed according to a depth of field, so that discomfort caused by the visual convergence adjustment conflict can be relieved. By means of the solution, a same feeling of viewing the real world by human eyes is simulated, and when a point is focused on, an object of another depth of field is out of focus and blurred.

Further, it should be noted that, the embodiments shown in FIG. 17 and FIG. 18 may be combined, that is, an optimized rendering method based on an area at a gazing point and a depth of field of the gazing point is used.

The two manners are combined. For an area at a visual gazing point, different rendering is performed according to depths of field, and for an area that is not the area at the gazing point, rendering is performed by lowering a resolution. In this way, load of the GPU can be reduced, and discomfort caused by the visual convergence adjustment conflict can be relieved, to relieve a fatigue feeling and a vertigo feeling caused to the user during viewing in the VR scene.

It may be learned that, by means of the foregoing solution, depth information corresponding to at least one target point in a target area can be determined according to two initial media files, and then, one image is selected from the two initial media files as a media file, and a second media file is calculated according to the selected media file and the depth information, to respectively output the two media files in different output apparatuses. In this way, a problem that a user cannot perceive corresponding depth information in all target points in a target area due to simply outputting two initial media files can be avoided, and a media file for one eye is calculated in real time according to depth information and a media file corresponding to the other eye, to ensure correctness of depth information of a target point observed by the user at any angle of view, thereby ensuring no error for visual perception by the user.

In addition, this embodiment further provides that after a first display area that the user gazes at in a display interface of the media file is detected, based on a depth of field, in the display interface, of the first display area, a definition of the media file in the display area is adjusted, so that a definition of the first display area after adjustment is higher than definitions of all or some of other areas. In the foregoing embodiment, a definition of the display interface of the media file is adjusted by using the depth of field of the area that the user gazes at, so that definitions of different display areas in the display interface are different, and information displayed in the display interface includes information about the depth of field. In this way, when a focus of a visual system of the user is fixed on a screen of a display device, eye focus adjustment matches the depth information in the information in the display interface, and convergence adjustment and focus adjustment are performed at the same time, thereby eliminating a convergence adjustment conflict, and resolving a technical problem of a visual convergence adjustment conflict.

Figure 19:
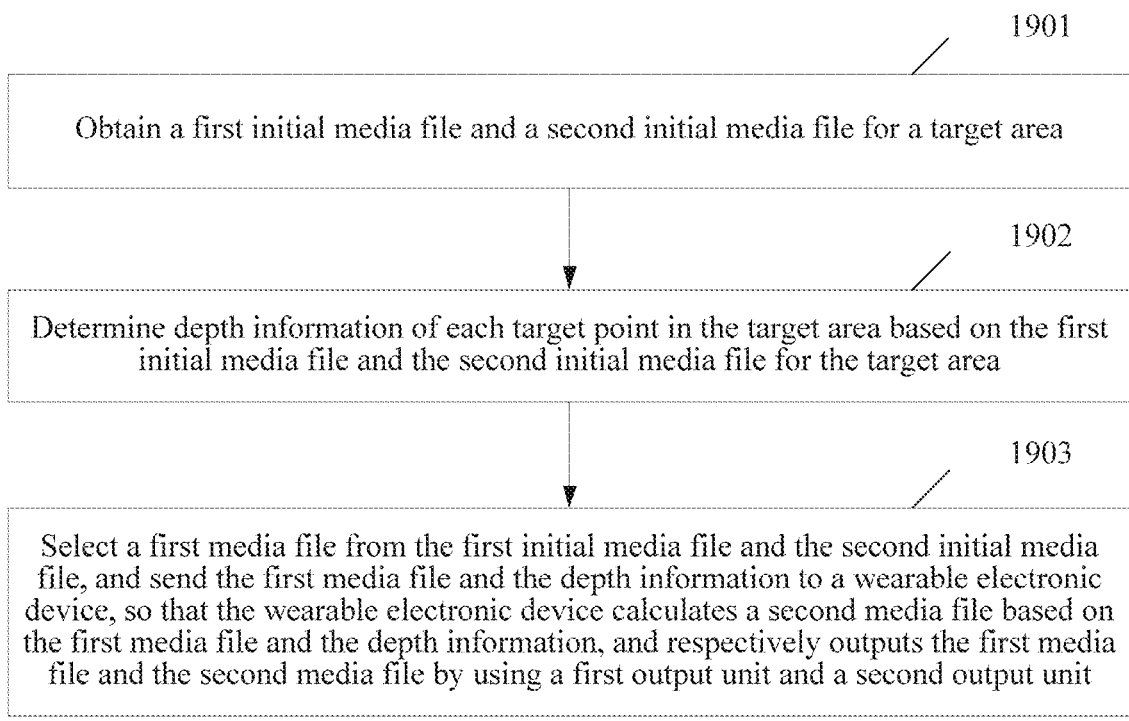
FIG. 19 is a third schematic flowchart of an information processing method according to this application.

An embodiment of this application provides an information processing method, applied to a processing apparatus. As shown in FIG. 19, the method includes the following steps:

Step 1901: Obtain a first initial media file and a second initial media file for a target area, the first initial media file being an image acquired based on a first location of the target area, and the second initial media file being an image acquired based on a second location of the target area.

Step 1902: Determine depth information of each target point in the target area based on the first initial media file and the second initial media file for the target area.

Step 1903: Select a first media file from the first initial media file and the second initial media file, and send the first media file and the depth information to a wearable electronic device, so that the wearable electronic device calculates a second media file based on the first media file and the depth information, and respectively outputs the first media file and the second media file by using a first output unit and a second output unit, the second media file representing that an image for the target area can be acquired at a third location.

Herein, the method provided in this embodiment may be applied to the processing apparatus. Further, after calculating the first media file and the depth information, the processing apparatus sends the first media file and the depth information to the wearable electronic device. The wearable electronic device may be smart glasses. For example, referring to FIG. 2, a user may wear the smart glasses, and then processes the two initial media files by using the smart glasses.

The two initial media files may be initial media files that are respectively acquired by two image acquisition apparatuses disposed at the first location and the second location.

For a disposition manner of the two image acquisition apparatuses, refer to FIG. 3 and FIG. 4. In FIG. 3, two image acquisition apparatuses are disposed in one apparatus and are respectively disposed at a first location 31 and a second location 32. In such a scenario, the two locations are adjacent to each other in a same horizontal line. In FIG. 4, two image acquisition apparatuses are disposed in one apparatus and are respectively disposed at a first location 41 and a second location 42. In a scenario shown in FIG. 4, the two locations may be adjacent to each other in a vertical distance.

Acquisition of a target area in FIG. 3 or FIG. 4 may be acquisition of information in a direction. Based on FIG. 3 and FIG. 4, one set of acquisition apparatuses in FIG. 3 or FIG. 4 may be disposed in each of four directions, to perform omni-directional image acquisition. For example, refer to FIG. 5 and FIG. 6. For a device shown in FIG. 5, an entire device is fixed by using a fixing component 51, and then, one set of sub-component including two image acquisition apparatuses is disposed in each of four directions, that is, east, west, south, and north; and the sub-components are respectively sub-components 521, 522, 523 and 524. The two image acquisition apparatuses in each set of sub-component are respectively disposed at a first location and a second location in the respective sub-component. Detailed descriptions are the same as those in FIG. 3, and details are not described herein again. For a device shown in FIG. 6, one set of sub-component including the two image acquisition apparatuses shown in FIG. 4 is disposed in each of four directions, that is, east, west, south, and north, for image acquisition. The two image acquisition apparatuses included in each sub-component are respectively disposed at a first location and a second location. Specific content included in each sub-component is shown in FIG. 4, and details are not described herein again.

An example in which the device shown in FIG. 5 performs image acquisition, and two initial media files acquired by two image acquisition units in the sub-component 521 are selected is used for description. For example, referring to FIG. 7, the two image acquisition apparatuses in the sub-component 521 respectively acquire a first initial media file C1 and a second initial media file C2. In addition, it may be learned from what is shown in FIG. 7 that, for the two initial media files, image acquisition is performed for a same scene, and a same target area is acquired.

Further, because there is a first distance between the two image acquisition apparatuses horizontally, there is a difference between the two initial media files. For example, a partial image at the leftmost of the first initial media file may fail to be acquired at the leftmost of the second initial media file.

It may be understood that, for image acquisition in the foregoing descriptions in this embodiment, acquisition may be performed by using a stereo camera.

In addition, processing in step 1901 may be inputting two initial media files acquired by the stereo camera to the processing apparatus.

The determining depth information of each target point in the target area based on the first initial media file and the second initial media file for the target area includes:

selecting image information of at least one target point in the target area from the first initial media file; and selecting image information of at least one target point in the target area from the second initial media file; and determining, according to the image information that is selected for the at least one target point in the target area from each of the first initial media file and the second initial media file, depth information corresponding to each of the at least one target point.

Image information of a target point may include: pixel information of each pixel included in the target point, and location information of each pixel in an image.

For example, referring to FIG. 8, there is a parallax when a same target point in the target area exists in the two initial media files C2 and C1. Assuming that a coordinate location of a target point in the target area in the first initial media file C1 is C1 (x1, y1), and a coordinate location in the second initial media file C2 is C2 (x2, y2), a difference value between the two coordinates may form a parallax.

The method further includes: obtaining a first distance between the first location and the second location; and correspondingly, the determining depth information of each target point in the target area includes:

calculating the depth information of each target point according to the first distance and image information corresponding to each of the at least one target point corresponding to each of the first initial media file and the second initial media file.

Further, calculation of the depth information is described with reference to the FIG. 9. A component 91 including two image acquisition apparatuses performs image acquisition for a target area C, and especially, performs image acquisition for a target point 92 in the target area C. In imaging areas of the image acquisition apparatuses, two location coordinates (x1, y1) and (x2, y2) corresponding to the target point 92 are obtained. In addition, because a first distance L between the two image acquisition apparatuses and a distance D between a lens of each image acquisition apparatus and the imaging area can be learned in advance, two angles a1 and a2 can be calculated by using L, D and the two location coordinates; and then, depth information H of the target point can be determined based on the two angles and the first distance L.

It may be understood that, only a calculation manner for depth information of a target point is provided in FIG. 9. In processing for the two initial media files shown in FIG. 7, the target area may be divided into multiple target points, and then, depth information of each target point is calculated.

The selecting image information of at least one target point in the target area from the first initial media file; and selecting image information of at least one target point in the target area from the second initial media file includes:

determining, according to the feature parameter corresponding to the target sub-area, a quantity of target points selected for each target sub-area.

Specifically, a manner of determining multiple target points in the target area may be selecting a target point according to scene richness of the target area. For example, a first quantity of target points are selected from an area with a relatively rich scene. For example, as shown in FIG. 10, assuming that areas determined by squares in two initial media files are areas with relatively rich scenes, three target points may be selected therefrom, and depth information is respectively calculated according to the three target points. It may be understood that, the foregoing descriptions are merely an example. In actual processing, more target points may be selected from a place determined by a square frame in the figure, and a calculation manner for depth information is shown above, and details are not described herein again.

In addition, the target area may be equally divided into a first preset quantity of target sub-areas. For example, referring to FIG. 11, the target area is divided into multiple target sub-areas, and each target sub-area may be the same as 1101. In addition, a manner of selecting a target point from each target sub-area may be selecting a second preset quantity of target points from each target sub-area. The second preset quantity may be 3 or higher. A calculation manner for each target point is shown above, and details are not described herein again.

The calculating a second media file based on the first media file and the depth information includes:

obtaining the third location, where the third location is different from an acquisition location corresponding to the first media file; and calculating the second media file according to the acquisition location corresponding to the first media file, the depth information, and the third location.

A triggering condition for calculating the second media file based on the first media file and the depth information may be that an output instruction is obtained, and when the output instruction is detected, the second media file is calculated. For example, when the method is applied to the wearable electronic device, that is, the smart glasses, when a panoramic 3D image is determined to be output, control is performed to start to calculate the second media file.

Further, the acquisition location corresponding to the first media file may be used as a location of a first eye, and correspondingly, the third location may be a location corresponding to a second eye and calculated based on a second distance between two eyes of a target user. Specifically, the second distance may be preset or may be acquired by using the wearable electronic device before the second media file is calculated. A presetting manner may be performing setting by a user according to an actual situation, or may be performing default setting by the wearable electronic device. Details are not described herein.

In addition, for the third location, based on horizontal and vertical coordinates corresponding to the acquisition location of the first media file, the vertical coordinate remains unchanged, and the horizontal coordinate of the acquisition location is increased by the second distance, to obtain the third location. That is, a vertical coordinate of the third location may be the same as the vertical coordinate of the acquisition location of the first media file.

A calculation manner for the calculating the second media file according to at least the first media file, the depth information, and the third location may be opposite to the calculation manner for the depth information, that is, may include: based on a second distance between the acquisition location of the first media file and the third location, and the depth information, for image information of at least one target point in a target area in the first media file, calculating image information corresponding to at least one target point in the corresponding second media file, to form the entire second media file.

Figure 20:
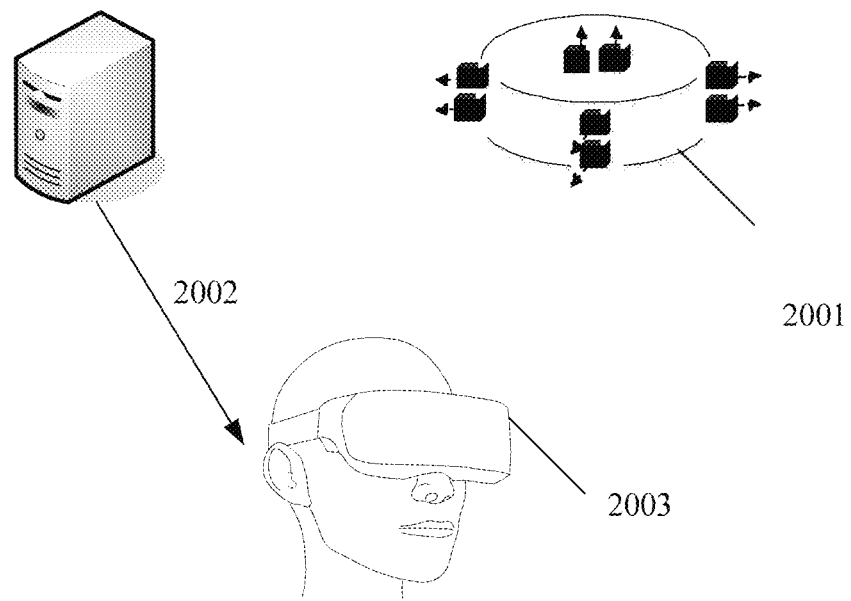
FIG. 20 is a schematic composition diagram of a system according to this application.

A processing scenario in this embodiment is described with reference to FIG. 20. First, an initial media file may be acquired by using a stereo camera 2001, and the acquired initial media file is sent to a processing apparatus 2002 for processing. Herein, it should be noted that, the processing apparatus may be a server or may be a computer. Implementation of the processing apparatus is not specifically described in this embodiment.

Further, after obtaining the first media file and the depth information, the processing apparatus 2002 sends the first media file and the depth information send to a wearable electronic device 2003.

The wearable electronic device 2003 performs processing according to the first media file and the depth information, to obtain images finally output to two eyes of the user, and outputs the first media file and the second media file respectively to the two eyes of the user, so that the user respectively observe the corresponding media files, to perceive a final image having a 3D effect.

It may be learned that, by means of the foregoing solution, depth information corresponding to at least one target point in a target area can be determined according to two initial media files, and then, one image is selected from the two initial media files as a media file, and a second media file is calculated according to the selected media file and the depth information, to respectively output the two media files in different output apparatuses. In this way, a problem that a user cannot perceive corresponding depth information in all target points in a target area due to simply outputting two initial media files can be avoided, and an image for one eye is calculated in real time according to depth information and an image corresponding to the other eye, to ensure correctness of depth information of a target point observed by the user at any angle of view, thereby ensuring no error for visual perception by the user.

Figure 21:
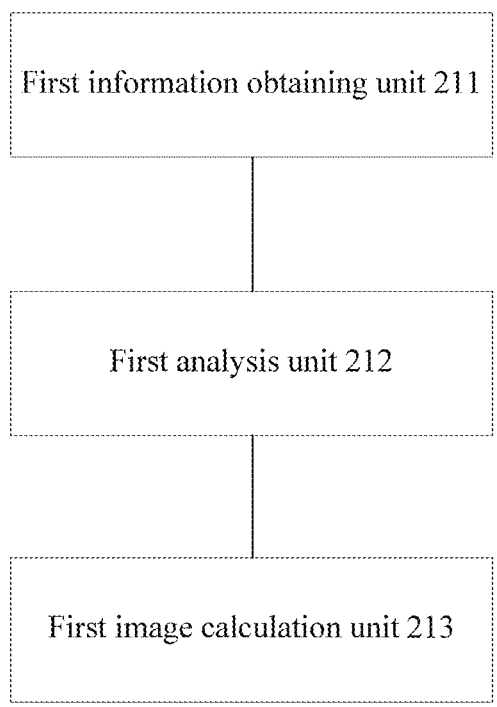
FIG. 21 is a first schematic diagram of a composition structure of a wearable electronic device according to this application.

An embodiment of this application provides a wearable electronic device. As shown in FIG. 21, the wearable electronic device includes:

a first information obtaining unit 211, configured to obtain a first initial media file and a second initial media file for a target area, the first initial media file being an image acquired based on a first location of the target area, and the second initial media file being an image acquired based on a second location of the target area;

a first analysis unit 212, configured to determine depth information of each target point in the target area based on the first initial media file and the second initial media file for the target area; and a first image calculation unit 213, configured to select a first media file from the first initial media file and the second initial media file, and calculate a second media file based on the first media file and the depth information, to control a first output unit 2004 and a second output unit 2005 to respectively output the first media file and the second media file, the second media file representing that an image for the target area can be acquired at a third location.

Herein, the method provided in this embodiment may be applied to a wearable electronic device. The wearable electronic device may be smart glasses. For example, referring to FIG. 2, a user may wear smart glasses, and then, processes two initial media files by using the smart glasses.

The two initial media files may be initial media files that are respectively acquired by two image acquisition apparatuses disposed at the first location and the second location.

For a disposition manner of the two image acquisition apparatuses, refer to FIG. 3 and FIG. 4. In FIG. 3, two image acquisition apparatuses are disposed in one apparatus and are respectively disposed at a first location 31 and a second location 32. In such a scenario, the two locations are adjacent to each other in a same horizontal line. In FIG. 4, two image acquisition apparatuses are disposed in one apparatus and are respectively disposed at a first location 41 and a second location 42. In a scenario shown in FIG. 4, the two locations may be adjacent to each other in a vertical distance.

Acquisition of a target area in FIG. 3 or FIG. 4 may be acquisition of information in a direction. Based on FIG. 3 and FIG. 4, one set of acquisition apparatuses in FIG. 3 or FIG. 4 may be disposed in each of four directions, to perform omni-directional image acquisition. For example, refer to FIG. 5 and FIG. 6. For a device shown in FIG. 5, an entire device is fixed by using a fixing component 51, and then, one set of sub-component including two image acquisition apparatuses is disposed in each of four directions, that is, east, west, south, and north; and the sub-components are respectively sub-components 521, 522, 523 and 524. The two image acquisition apparatuses in each set of sub-component are respectively disposed at a first location and a second location in the respective sub-component. Detailed descriptions are the same as those in FIG. 3, and details are not described herein again. For a device shown in FIG. 6, one set of sub-component including the two image acquisition apparatuses shown in FIG. 4 is disposed in each of four directions, that is, east, west, south, and north, for image acquisition. The two image acquisition apparatuses included in each sub-component are respectively disposed at a first location and a second location. Specific content included in each sub-component is shown in FIG. 4, and details are not described herein again.

An example in which the device shown in FIG. 5 performs image acquisition, and two initial media files acquired by two image acquisition units in the sub-component 521 are selected is used for description. For example, referring to FIG. 7, the two image acquisition apparatuses in the sub-component 521 respectively acquire a first initial media file C1 and a second initial media file C2. In addition, it may be learned from what is shown in FIG. 7 that, for the two initial media files, image acquisition is performed for a same scene, and a same target area is acquired.

Further, because there is a first distance between the two image acquisition apparatuses horizontally, there is a difference between the two initial media files. For example, a partial image at the leftmost of the first initial media file may fail to be acquired at the leftmost of the second initial media file.

It may be understood that, for image acquisition in the foregoing descriptions in this embodiment, acquisition may be performed by using a stereo camera.

In addition, the first information obtaining unit is configured to obtain two initial media files from the stereo camera.

The determining depth information of each target point in the target area based on the first initial media file and the second initial media file for the target area includes:

selecting image information of at least one target point in the target area from the first initial media file; and selecting image information of at least one target point in the target area from the second initial media file; and determining, according to the image information that is selected for the at least one target point in the target area from each of the first initial media file and the second initial media file, depth information corresponding to each of the at least one target point.

Image information of a target point may include: pixel information of each pixel included in the target point, and location information of each pixel in an image.

For example, referring to FIG. 8, there is a parallax when a same target point in the target area exists in the two initial media files C2 and C1. Assuming that a coordinate location of a target point in the target area in the first initial media file C1 is C1 (x1, y1), and a coordinate location in the second initial media file C2 is C2 (x2, y2), a difference value between the two coordinates may form a parallax.

The method further includes: obtaining a first distance between the first location and the second location; and correspondingly, the determining depth information of each target point in the target area includes:

calculating the depth information of each target point according to the first distance and image information corresponding to each of the at least one target point corresponding to each of the first initial media file and the second initial media file.

Further, calculation of the depth information is described with reference to the FIG. 9. A component 91 including two image acquisition apparatuses performs image acquisition for a target area C, and especially, performs image acquisition for a target point 92 in the target area C. In imaging areas of the image acquisition apparatuses, two location coordinates (x1, y1) and (x2, y2) corresponding to the target point 92 are obtained. In addition, because a first distance L between the two image acquisition apparatuses and a distance D between a lens of each image acquisition apparatus and the imaging area can be learned in advance, two angles a1 and a2 can be calculated by using L, D and the two location coordinates; and then, depth information H of the target point can be determined based on the two angles and the first distance L.

It may be understood that, only a calculation manner for depth information of a target point is provided in FIG. 9. In processing for the two initial media files shown in FIG. 7, the target area may be divided into multiple target points, and then, depth information of each target point is calculated.

The selecting image information of at least one target point in the target area from the first initial media file; and selecting image information of at least one target point in the target area from the second initial media file includes:

dividing the target area into at least one target sub-area; and selecting image information corresponding to a target point from each of at least one target sub-area in the first initial media file; and selecting image information corresponding to a target point from each of at least one target sub-area in the second initial media file.

Specifically, a manner of determining multiple target points in the target area may be selecting a target point according to scene richness of the target area. For example, a first quantity of target points are selected from an area with a relatively rich scene. For example, as shown in FIG. 10, assuming that areas determined by squares in two initial media files are areas with relatively rich scenes, three target points may be selected therefrom, and depth information is respectively calculated according to the three target points. It may be understood that, the foregoing descriptions are merely an example. In actual processing, more target points may be selected from a place determined by a square frame in the figure, and a calculation manner for depth information is shown above, and details are not described herein again.

In addition, the target area may be equally divided into a first preset quantity of target sub-areas. For example, referring to FIG. 11, the target area is divided into multiple target sub-areas, and each target sub-area may be the same as 1101. In addition, a manner of selecting a target point from each target sub-area may be selecting a second preset quantity of target points from each target sub-area. The second preset quantity may be 3 or higher. A calculation manner for each target point is shown above, and details are not described herein again.

The calculating a second media file based on the first media file and the depth information includes:

obtaining the third location, where the third location is different from an acquisition location corresponding to the first media file; and calculating the second media file according to the acquisition location corresponding to the first media file, the depth information, and the third location.

A triggering condition for calculating the second media file based on the first media file and the depth information may be that an output instruction is obtained, and when the output instruction is detected, the second media file is calculated. For example, when the method is applied to the wearable electronic device, that is, the smart glasses, when a panoramic 3D image is determined to be output, control is performed to start to calculate the second media file.

Further, the acquisition location corresponding to the first media file may be used as a location of a first eye, and correspondingly, the third location may be a location corresponding to a second eye and calculated based on a second distance between two eyes of a target user. Specifically, the second distance may be preset or may be acquired by using the wearable electronic device before the second media file is calculated. A presetting manner may be performing setting by a user according to an actual situation, or may be performing default setting by the wearable electronic device. Details are not described herein.

In addition, for the third location, based on horizontal and vertical coordinates corresponding to the acquisition location of the first media file, the vertical coordinate remains unchanged, and the horizontal coordinate of the acquisition location is increased by the second distance, to obtain the third location. That is, a vertical coordinate of the third location may be the same as the vertical coordinate of the acquisition location of the first media file.

A calculation manner for the calculating the second media file according to at least the first media file, the depth information, and the third location may be opposite to the calculation manner for the depth information, that is, may include: based on a second distance between the acquisition location of the first media file and the third location, and the depth information, for image information of at least one target point in a target area in the first media file, calculating image information corresponding to at least one target point in the corresponding second media file, to form the entire second media file.

In the foregoing processing scenario, the first media file and the second media file may be respectively output to the two eyes of the user, so that the user respectively observes the corresponding media files, to perceive a final image having a 3D effect.

Figure 22:
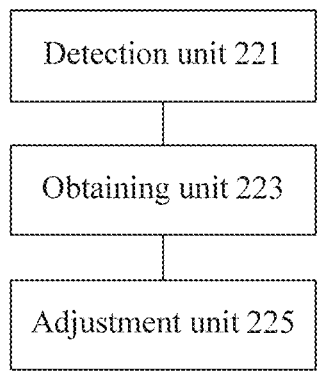
FIG. 22 is a second schematic diagram of a composition structure of a wearable electronic device according to this application.

Based on the foregoing embodiment, with reference to FIG. 21, referring to FIG. 22, the wearable electronic device further includes:

a detection unit 221, configured to detect a first display area that a user gazes at in each of the first media file and the second media file that are displayed by the first output unit and the second output unit, where the first media file and the second media file are displayed in a VR scene, and the first output unit and the second output unit are configured to provide the VR scene;

a third obtaining unit 223, configured to obtain a depth of field, in the display interface, of the first display area corresponding to each of the first media file and the second media file; and an adjustment unit 225, configured to adjust a definition of a display area in the display interface based on the depth of field, where a definition of the first display area after adjustment is higher than a definition of a second display area after adjustment, and the second display area is all or some of areas other than the first display area in the display interface.

After a first display area that the user gazes at in a display interface of the media file is detected, based on a depth of field, in the display interface, of the first display area, a definition of the media file in the display area is adjusted, so that a definition of the first display area after adjustment is higher than definitions of all or some of other areas. In the foregoing embodiment, a definition of the display interface of the media file is adjusted by using the depth of field of the area that the user gazes at, so that definitions of different display areas in the display interface are different, and information displayed in the display interface includes information about the depth of field. In this way, when a focus of a visual system of the user is fixed on a screen of a display device, eye focus adjustment matches the depth information in the information in the display interface, and convergence adjustment and focus adjustment are performed at the same time, thereby eliminating a convergence adjustment conflict, and resolving a technical problem of a visual convergence adjustment conflict.

In the foregoing embodiment, the definitions of the files viewed by the visual system are different, so that the convergence adjustment conflict is eliminated, that is, when a media file is viewed in a VR scene provided by the display device, focus adjustment and convergence adjustment are performed at the same time, thereby preventing the user from generating visual fatigue and a vertigo feeling.

The display device in this embodiment of this application may be a head mounted display device. The display device is configured to provide the VR scene, and the user (that is, a person who uses the display device) may operate an operation interface in the VR scene to start to play the media file. After the media file starts to be played, the first display area that the user gazes at in the display interface of the media file is detected. In some embodiments, after the display device is enabled, an image acquisition device may be enabled. The image acquisition device is used to acquire movement information of the visual system of the user of the display device, and the first display area is determined by using the acquired movement information of the visual system. The first display area may include one or more pixels. The image acquisition device includes a camera. Specifically, there may be two cameras, and a camera is disposed at a location of each eye.

The image acquisition device may be used to acquire the movement information of the visual system of the user of the display device by means of eyeball tracking. By means of the technology, the user can operate the screen without touching the screen (the screen may be a screen in the VR scene).

When eyes of a human look in different directions, there are small changes in the eyes, and these changes cause features that can be extracted. A computer may extract these features by means of image capturing or scanning, to track changes in the eyes. Based on the changes in the eyes, a status and a requirement of the user are predicted and responded to, to achieve an objective of controlling the device by using the eyes Eyeball tracking may be implemented by at least one of the following: tracking according to changes in a feature of an eyeball and a feature of a place around the eyeball, tracking according to a change in an iris angle, or extracting a feature by transmitting an infrared light beam to an iris.

In the foregoing technical solution, after the first display area that the user gazes at in each of the playing interfaces of the media files is detected, the depth of field, in the display interface of the media file, of the first display area may be obtained.

The depth of field is a distance range between photographed objects measured for imaging when a front edge of a camera lens or another imager can obtain a clear image. After focusing is done, a clear image can be formed within a range around a focus, and the distance range is the depth of field. After the image is obtained, a depth of field of the image may be determined based on a circle of confusion. Around the focus, light rays are gathered and diffused, a point is imaged as a circle to a focus, and then changes to a circle by means of diffusion. Circles around the focus are referred to as circles of confusion.

In the foregoing embodiment, a depth of field of each display area in each of the display interfaces of the media files may be obtained in advance, and after the first display area that the user gazes at in the playing interface of the media file is detected, the depth of field, in the display interface of the media file, of the first display area is directly read from the obtained depth of field. Alternatively, after the first display area that the user gazes at in each of the playing interfaces of the media files is detected, the depth of field, in the display interface of the media file, of each display area is determined, and the depth of field of the first display area is obtained.

According to the foregoing embodiment of this application, before the depth of field, in the display interface of the media file, of the first display area is obtained, a parallax when the user uses the display device to view the media file may be determined. The depth of field of each display area in the display interface of the media file may be calculated by using the parallax; and the depth of field of each display area is stored, to obtain a depth of field file of the media file. The obtaining the depth of field of the display area in the media file includes: reading the depth of field of the first display area from the depth of field file.

In an application scenario of VR, there is a parallax for a 3D file viewed by left and right eyes of a human visual system, a depth of field of each display area in each of the display interfaces of the media files viewed by the left eye is obtained, and a depth of field of each display area in each of the display interfaces of the media files that are viewed by the right eye may be obtained. A depth of field of each display area in the display interface of the media file is calculated by using a parallax when the left and right eyes of the human use the display device. Further, a depth of field of each pixel may be recorded. Data of the obtained depth of field is stored, to obtain a depth of field file. After the first display area is detected, the depth of field of the first display area may be rapidly determined by using the depth of field file. For example, an average value of the depths of field of all the pixels in the first display area may be used as the depth of field of the first display area; a maximum value of the depths of field of the pixels in the first display area may be used as the depth of field of the first display area; a minimum value of the depths of field of the pixels in the first display area may be used as the depth of field of the first display area; or a weighted average value of the pixels of the first display area may be used as the depth of field of the first display area.

In the foregoing embodiment, the definition of each display area in the display interface of the media file may be adjusted based on the depth of field, in the display interface of the media file, of the first display area, to adjust the definition of the first display area to be the highest, and adjust a definition of another display area to be lower than the definition of the first display area. For example, the definition of the another display area may be adjusted to be relatively high or relatively low.

In some embodiments, all areas other than the first display area in the display interface of each of the two media files may be determined as the second display area; or some areas other than the first display area in the display interface of each of the two media files may be determined as the second display area. For example, the first display area after adjustment is a display area having the highest definition in the display interface of the entire media file, but the display interface of the media file after adjustment may further include another display area having a same definition as the first display area.

According to the foregoing embodiment of this application, the adjustment unit may include: a first determining module, configured to determine, in the display interface of the media file, a display area having a depth of field different from the depth of field of each first display area, as the second display area; and a first setting module, configured to set the definition of the second display area in the display interface to be lower than the definition of the first display area.

Specifically, the first setting module may include: an obtaining submodule, configured to obtain a depth of field of each display sub-area in the second display area; a determining submodule, configured to determine a depth difference between the depth of field of each display sub-area in the second display area and the depth of field of the first display area; and a first setting submodule, configured to set definitions of different display sub-areas according to the depth difference, where a larger depth difference corresponding to a display sub-area indicates a lower definition to be set for the display sub-area.

According to the foregoing embodiment of this application, the first setting module may include: a second setting submodule, configured to lower definitions of display sub-areas that are centered on the first display area, in a predetermined radiation path, and in the second display area, where the predetermined radiation path is a radiation path far away from the first display area.

By means of this embodiment, information about a media file with a depth may be obtained, and when a user views the information, there is no visual convergence conflict, and fatigue is prevented.

In some embodiments, the adjustment unit may include: a first obtaining module, configured to obtain a third display area that is in the display interface corresponding to each of the first media file and the second media file and that has a same depth of field as the first display area corresponding to each of the first media file and the second media file; and a second setting module, configured to set definitions of some or all of areas in the third display area in the display interface to the definition of the first display area.

Specifically, the second setting module is specifically configured to: set a definition of a display sub-area that is in the third display area and whose distance to the first display area exceeds a predetermined distance to be lower than the definition of the first display area.

By means of this embodiment, definitions of display areas are selectively lowered, thereby ensuring that an amount of data to be processed is reduced when the user views the file.

Further, the detection unit may include: a detection module, configured to detect a gazing point of the user in the display interface of the media file; and an obtaining module, configured to obtain a field of view range of the gazing point in the display interface corresponding to the media file, and determining the field of view range as the first display area.

In some embodiments, the adjustment unit is specifically configured to adjust a display resolution of the display area in the display interface based on the depth of field.

According to the foregoing embodiment of this application, the processing unit is configured to: before the depth of field, in the display interface of the media file, of the first display area is obtained, determine a parallax when the user uses the display device to view the media file; calculate the depth of field of each display area in the media file by using the parallax; and store the depth of field of each display area, to obtain a depth of field file of the media file. The obtaining unit is specifically configured to read the depth of field of the first display area from the depth of field file.

It should be noted that, the media file in the foregoing embodiment may include a static file such as an image, or may be a dynamic file, for example, a file such as an animation or a video.

It may be learned that, by means of the foregoing solution, depth information corresponding to at least one target point in a target area can be determined according to two initial media files, and then, one image is selected from the two initial media files as a media file, and a second media file is calculated according to the selected media file and the depth information, to respectively output the two media files in different output apparatuses. In this way, a problem that a user cannot perceive corresponding depth information in all target points in a target area due to simply outputting two initial media files can be avoided, and an image for one eye is calculated in real time according to depth information and an image corresponding to the other eye, to ensure correctness of depth information of a target point observed by the user at any angle of view, thereby ensuring no error for visual perception by the user.

Figure 23:
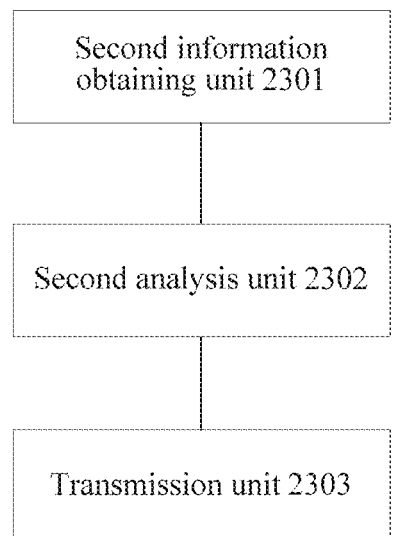
FIG. 23 is a schematic diagram of a composition structure of a processing apparatus according to this application.

An embodiment of this application provides a processing apparatus. As shown in FIG. 23, the processing apparatus includes:

a second information obtaining unit 2301, configured to obtain a first initial media file and a second initial media file for a target area, the first initial media file being an image acquired based on a first location, and the second initial media file being an image acquired based on a second location;

a second analysis unit 2302, configured to determine depth information of each target point in the target area based on the first initial media file and the second initial media file for the target area; and a transmission unit 2303, configured to: select a first media file from the first initial media file and the second initial media file, and send the first media file and the depth information to a wearable electronic device.

Herein, the method provided in this embodiment may be applied to the processing apparatus. Further, after calculating the first media file and the depth information, the processing apparatus sends the first media file and the depth information to the wearable electronic device. The wearable electronic device may be smart glasses. For example, referring to FIG. 2, a user may wear the smart glasses, and then processes the two initial media files by using the smart glasses.

The two initial media files may be initial media files that are respectively acquired by two image acquisition apparatuses disposed at the first location and the second location.

For a disposition manner of the two image acquisition apparatuses, refer to FIG. 3 and FIG. 4. In FIG. 3, two image acquisition apparatuses are disposed in one apparatus and are respectively disposed at a first location 31 and a second location 32. In such a scenario, the two locations are adjacent to each other in a same horizontal line. In FIG. 4, two image acquisition apparatuses are disposed in one apparatus and are respectively disposed at a first location 41 and a second location 42. In a scenario shown in FIG. 4, the two locations may be adjacent to each other in a vertical distance.

Acquisition of a target area in FIG. 3 or FIG. 4 may be acquisition of information in a direction. Based on FIG. 3 and FIG. 4, one set of acquisition apparatuses in FIG. 3 or FIG. 4 may be disposed in each of four directions, to perform omni-directional image acquisition. For example, refer to FIG. 5 and FIG. 6. For a device shown in FIG. 5, an entire device is fixed by using a fixing component 51, and then, one set of sub-component including two image acquisition apparatuses is disposed in each of four directions, that is, east, west, south, and north; and the sub-components are respectively sub-components 521, 522, 523 and 524. The two image acquisition apparatuses in each set of sub-component are respectively disposed at a first location and a second location in the respective sub-component. Detailed descriptions are the same as those in FIG. 3, and details are not described herein again. For a device shown in FIG. 6, one set of sub-component including the two image acquisition apparatuses shown in FIG. 4 is disposed in each of four directions, that is, east, west, south, and north, for image acquisition. The two image acquisition apparatuses included in each sub-component are respectively disposed at a first location and a second location. Specific content included in each sub-component is shown in FIG. 4, and details are not described herein again.

An example in which the device shown in FIG. 5 performs image acquisition, and two initial media files acquired by two image acquisition units in the sub-component 521 are selected is used for description. For example, referring to FIG. 7, the two image acquisition apparatuses in the sub-component 521 respectively acquire a first initial media file C1 and a second initial media file C2. In addition, it may be learned from what is shown in FIG. 7 that, for the two initial media files, image acquisition is performed for a same scene, and a same target area is acquired.

Further, because there is a first distance between the two image acquisition apparatuses horizontally, there is a difference between the two initial media files. For example, a partial image at the leftmost of the first initial media file may fail to be acquired at the leftmost of the second initial media file.

It may be understood that, for image acquisition in the foregoing descriptions in this embodiment, acquisition may be performed by using a stereo camera.

In addition, two initial media files acquired by the stereo camera are input to the processing apparatus.

The determining depth information of each target point in the target area based on the first initial media file and the second initial media file for the target area includes:

selecting image information of at least one target point in the target area from the first initial media file; and selecting image information of at least one target point in the target area from the second initial media file; and determining, according to the image information that is selected for the at least one target point in the target area from each of the first initial media file and the second initial media file, depth information corresponding to each of the at least one target point.

Image information of a target point may include: pixel information of each pixel included in the target point, and location information of each pixel in an image.

For example, referring to FIG. 8, there is a parallax when a same target point in the target area exists in the two initial media files C2 and C1. Assuming that a coordinate location of a target point in the target area in the first initial media file C1 is C1 (x1, y1), and a coordinate location in the second initial media file C2 is C2 (x2, y2), a difference value between the two coordinates may form a parallax.

The method further includes: obtaining a first distance between the first location and the second location; and correspondingly, the determining depth information of each target point in the target area includes:

calculating the depth information of each target point according to the first distance and image information corresponding to each of the at least one target point corresponding to each of the first initial media file and the second initial media file.

Further, calculation of the depth information is described with reference to the FIG. 9. A component 91 including two image acquisition apparatuses performs image acquisition for a target area C, and especially, performs image acquisition for a target point 92 in the target area C. In imaging areas of the image acquisition apparatuses, two location coordinates (x1, y1) and (x2, y2) corresponding to the target point 92 are obtained. In addition, because a first distance L between the two image acquisition apparatuses and a distance D between a lens of each image acquisition apparatus and the imaging area can be learned in advance, two angles a1 and a2 can be calculated by using L, D and the two location coordinates; and then, depth information H of the target point can be determined based on the two angles and the first distance L.

It may be understood that, only a calculation manner for depth information of a target point is provided in FIG. 9. In processing for the two initial media files shown in FIG. 7, the target area may be divided into multiple target points, and then, depth information of each target point is calculated.

The selecting image information of at least one target point in the target area from the first initial media file; and selecting image information of at least one target point in the target area from the second initial media file includes:

dividing the target area into at least one target sub-area; and selecting image information corresponding to a target point from each of at least one target sub-area in the first initial media file; and selecting image information corresponding to a target point from each of at least one target sub-area in the second initial media file.

Specifically, a manner of determining multiple target points in the target area may be selecting a target point according to scene richness of the target area. For example, a first quantity of target points are selected from an area with a relatively rich scene. For example, as shown in FIG. 10, assuming that areas determined by squares in two initial media files are areas with relatively rich scenes, three target points may be selected therefrom, and depth information is respectively calculated according to the three target points. It may be understood that, the foregoing descriptions are merely an example. In actual processing, more target points may be selected from a place determined by a square frame in the figure, and a calculation manner for depth information is shown above, and details are not described herein again.

In addition, the target area may be equally divided into a first preset quantity of target sub-areas. For example, referring to FIG. 11, the target area is divided into multiple target sub-areas, and each target sub-area may be the same as 1101. In addition, a manner of selecting a target point from each target sub-area may be selecting a second preset quantity of target points from each target sub-area. The second preset quantity may be 3 or higher. A calculation manner for each target point is shown above, and details are not described herein again.

The calculating a second media file based on the first media file and the depth information includes:

obtaining the third location, where the third location is different from an acquisition location corresponding to the first media file; and calculating the second media file according to the acquisition location corresponding to the first media file, the depth information, and the third location.

A triggering condition for calculating the second media file based on the first media file and the depth information may be that an output instruction is obtained, and when the output instruction is detected, the second media file is calculated. For example, when the method is applied to the wearable electronic device, that is, the smart glasses, when a panoramic 3D image is determined to be output, control is performed to start to calculate the second media file.

Further, the acquisition location corresponding to the first media file may be used as a location of a first eye, and correspondingly, the third location may be a location corresponding to a second eye and calculated based on a second distance between two eyes of a target user. Specifically, the second distance may be preset or may be acquired by using the wearable electronic device before the second media file is calculated. A presetting manner may be performing setting by a user according to an actual situation, or may be performing default setting by the wearable electronic device. Details are not described herein.

In addition, for the third location, based on horizontal and vertical coordinates corresponding to the acquisition location of the first media file, the vertical coordinate remains unchanged, and the horizontal coordinate of the acquisition location is increased by the second distance, to obtain the third location. That is, a vertical coordinate of the third location may be the same as the vertical coordinate of the acquisition location of the first media file.

A calculation manner for the calculating the second media file according to at least the first media file, the depth information, and the third location may be opposite to the calculation manner for the depth information, that is, may include: based on a second distance between the acquisition location of the first media file and the third location, and the depth information, for image information of at least one target point in a target area in the first media file, calculating image information corresponding to at least one target point in the corresponding second media file, to form the entire second media file.

A processing scenario in this embodiment is described with reference to FIG. 20. First, an initial media file may be acquired by using a stereo camera 2001, and the acquired initial media file is sent to a processing apparatus 2002 for processing. Herein, it should be noted that, the processing apparatus may be a server or may be a computer. Implementation of the processing apparatus is not specifically described in this embodiment.

Further, after obtaining the first media file and the depth information, the processing apparatus 2002 sends the first media file and the depth information send to a wearable electronic device 2003.

The wearable electronic device 2003 performs processing according to the first media file and the depth information, to obtain images finally output to two eyes of the user, and outputs the first media file and the second media file respectively to the two eyes of the user, so that the user respectively observe the corresponding media files, to perceive a final image having a 3D effect.

It may be learned that, by means of the foregoing solution, depth information corresponding to at least one target point in a target area can be determined according to two initial media files, and then, one image is selected from the two initial media files as a media file, and a second media file is calculated according to the selected media file and the depth information, to respectively output the two media files in different output apparatuses. In this way, a problem that a user cannot perceive corresponding depth information in all target points in a target area due to simply outputting two initial media files can be avoided, and an image for one eye is calculated in real time according to depth information and an image corresponding to the other eye, to ensure correctness of depth information of a target point observed by the user at any angle of view, thereby ensuring no error for visual perception by the user.

Figure 24:
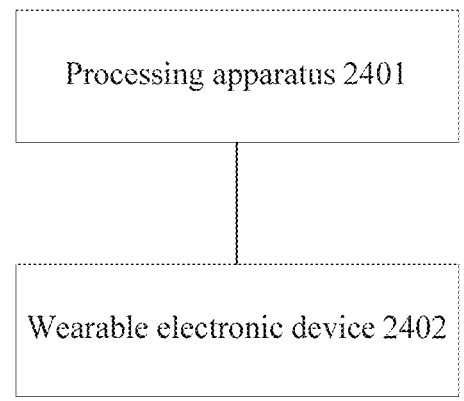
FIG. 24 is a schematic diagram of a composition structure of an information processing system according to this application.

With reference to the processing apparatus provided in Embodiment 4, this embodiment provides an information processing system, as shown in FIG. 24, including:

a processing apparatus 2401, configured to: obtain a first initial media file and a second initial media file for a target area, the first initial media file being an image acquired based on a first location, and the second initial media file being an image acquired based on a second location; determine depth information of each target point in the target area based on the first initial media file and the second initial media file for the target area; and select a first media file from the first initial media file and the second initial media file, and send the first media file and the depth information to a wearable electronic device; and the wearable electronic device 2402, configured to: calculate a second media file based on the first media file and the depth information, and respectively output the first media file and the second media file by using a first output unit and a second output unit, the second media file representing that an image for the target area can be acquired at a third location.

The wearable electronic device 2402 is configured to: obtain the third location, where the third location is different from an acquisition location corresponding to the first media file; and calculate the second media file according to at least the first media file, the depth information, and the third location.

It may be learned that, by means of the foregoing solution, depth information corresponding to at least one target point in a target area can be determined according to two initial media files, and then, one image is selected from the two initial media files as a media file, and a second media file is calculated according to the selected media file and the depth information, to respectively output the two media files in different output apparatuses. In this way, a problem that a user cannot perceive corresponding depth information in all target points in a target area due to simply outputting two initial media files can be avoided, and an image for one eye is calculated in real time according to depth information and an image corresponding to the other eye, to ensure correctness of depth information of a target point observed by the user at any angle of view, thereby ensuring no error for visual perception by the user.

Figure 25:
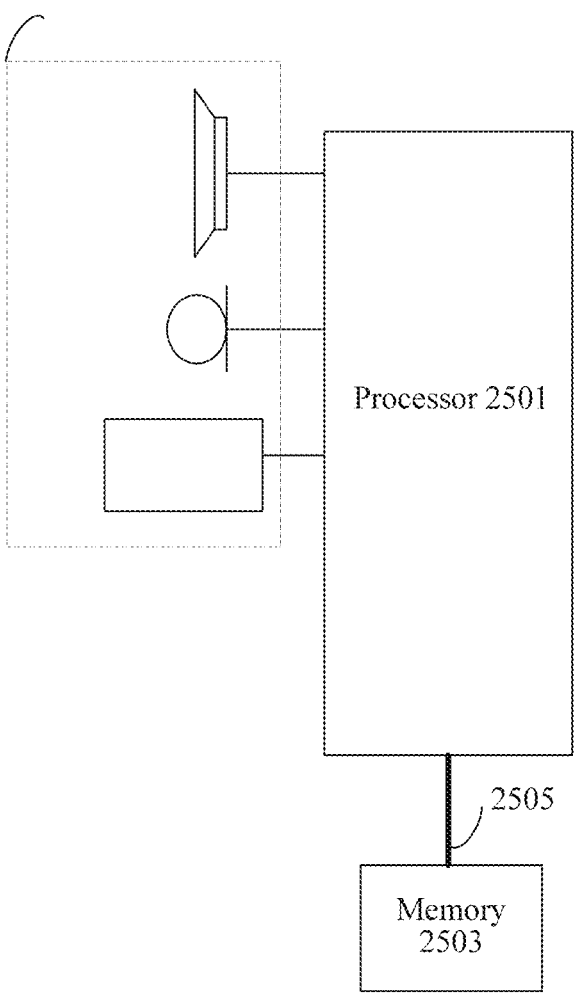
FIG. 25 is a schematic diagram of a hardware composition structure according to this application.

FIG. 25 is structural block diagram of a terminal according to an embodiment of this application. As shown in FIG. 25, the terminal may include: one or more (only one is shown in the figure) processors 2501, a memory 2503, and a transmission apparatus 2505 (for example, a sending apparatus in the foregoing embodiment), and as shown in FIG. 25, the terminal may further include an input/output device 2507.

The memory 2503 may be configured to store a software program and module, for example, a program instruction/module corresponding to the media file processing method and apparatus in the embodiments of this application. The processor 2501 executes various functional applications and performs data processing by running the software program and module stored in the memory 2503, that is, implements the foregoing media file processing method. The memory 2503 may include a high-speed random access memory, and may also include a non-volatile (e.g., non-transitory) memory such as one or more magnetic storage apparatuses, a flash memory, or another non-volatile solid-state memory. In some embodiments, the memory 2503 may further include memories remotely disposed relative to the processor 2501, and these remote memories may be connected to the terminal by using a network. Examples of the network include, but are not limited to, the Internet, an intranet, a local area network, a mobile communications network, and a combination thereof.

The transmission apparatus 2505 is configured to receive or send data by using a network, and may be further configured to transmit data between the processor and the memory. Specific examples of the foregoing network may include a wired network and a wireless network. In an example, the transmission apparatus 2505 includes a network interface controller (NIC) that may be connected to another network device and a router by using a network cable, thereby communicating with the Internet or a local area network. In an example, the transmission apparatus 2505 is a radio frequency (RF) module that is configured to communicate with the Internet in a wireless manner.

Specifically, the memory 2503 is configured to store an application program.

The processor 2501 may invoke, by using the transmission apparatus 2505, the application program stored in the memory 2503, to perform the following steps: obtaining a first initial media file and a second initial media file for a target area, the first initial media file being an image acquired based on a first location, and the second initial media file being an image acquired based on a second location;

determining depth information of each target point in the target area based on the first initial media file and the second initial media file for the target area; and selecting a first media file from the first initial media file and the second initial media file, and calculating a second media file based on the first media file and the depth information, to control a first output unit and a second output unit to respectively output the first media file and the second media file, the second media file representing that an image for the target area can be acquired at a third location;

obtaining a first initial media file and a second initial media file for a target area, the first initial media file being an image acquired based on a first location, and the second initial media file being an image acquired based on a second location; and determining depth information of each target point in the target area based on the first initial media file and the second initial media file for the target area.

In addition, when the schematic structural diagram in FIG. 25 is applied to the processing apparatus, specifically, the memory 2503 is configured to store the application program.

The processor 2501 may invoke, by using the transmission apparatus 2505, the application program stored in the memory 2503, to perform the following steps: selecting a first media file from the first initial media file and the second initial media file, and sending the first media file and the depth information to a wearable electronic device, so that the wearable electronic device calculates a second media file based on the first media file and the depth information, and respectively outputs the first media file and the second media file by using a first output unit and a second output unit, the second media file representing that an image for the target area can be acquired at a third location.

An embodiment of this application further provides a non-transitory computer readable storage medium. The non-transitory computer readable storage medium includes a set of instructions, and when being executed, the instructions cause at least one processor to perform the following operations:

obtaining a first initial media file and a second initial media file for a target area, the first initial media file being an image acquired based on a first location, and the second initial media file being an image acquired based on a second location;

determining depth information of each target point in the target area based on the first initial media file and the second initial media file for the target area; and selecting a first media file from the first initial media file and the second initial media file, and calculating a second media file based on the first media file and the depth information, to control a first output unit and a second output unit to respectively output the first media file and the second media file, the second media file representing that an image for the target area can be acquired at a third location.

An embodiment of this application further provides a non-transitory computer readable storage medium. The non-transitory computer readable storage medium includes a set of instructions, and when being executed, the instructions cause at least one processor to perform the following operations:

obtaining a first initial media file and a second initial media file for a target area, the first initial media file being an image acquired based on a first location, and the second initial media file being an image acquired based on a second location;

determining depth information of each target point in the target area based on the first initial media file and the second initial media file for the target area; and selecting a first media file from the first initial media file and the second initial media file, and sending the first media file and the depth information to a wearable electronic device.

When the integrated unit in the embodiments is implemented in the form of a software functional unit and sold or used as an independent product, the integrated unit may be stored in the computer-readable storage medium. Based on such an understanding, the technical solutions of this application essentially, or the part contributing to the existing technology, or all or some of the technical solutions may be implemented in a form of a software product. The computer software product is stored in a storage medium and includes several instructions for instructing one or more computer devices (which may be a PC, a server, a network device, or the like) to perform all or some of the steps of the method described in the embodiments of this application.

In the foregoing embodiments of this application, the description of each embodiment has respective focuses. For a part that is not described in detail in an embodiment, refer to related descriptions in other embodiments.

In the several embodiments provided in this application, it should be understood that the disclosed client may be implemented in other manners. The described apparatus embodiment is merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The foregoing descriptions are merely preferred implementations of this application. It should be noted that a person of ordinary skill in the art may make several improvements or refinements without departing from the principle of this application and the improvements or refinements shall fall within the protection scope of this application.

What is claimed is:

1. An information processing method performed by a wearable electronic device having one or more processors and memory storing a plurality of programs to be executed by the one or more processors, the method comprising:
   obtaining a first initial media file and a second initial media file for a target area, the first initial media file including a first image acquired based on a first location of the target area, and the second initial media file including a second image acquired based on a second location of the target area;
   determining depth information of each target point in the target area based on the first initial media file and the second initial media file, determining the depth information includes calculating:
   a first angle between (i) a first line connecting a point in the first image and a point in the second image and (ii) a second line connecting the point in the first image and the target point in the target area; and
   a second angle between (i) the first line connecting the point in the first image and the point in the second image and (ii) a third line connecting the point in the second image and the target point in the target area;
   selecting a first media file from the first initial media file and the second initial media file;
   calculating a second media file based on the first media file, the first angle, and the second angle, the calculated second media file representing an image for the target area that is acquired at a third location of the target area;
   outputting the first media file to a first output unit of the wearable electronic device; and
   outputting the calculated second media file to a second output unit of the wearable electronic device.

2. The method according to claim 1, wherein determining the depth information of one or more target point in the target area based on the first initial media file and the second initial media file for the target area comprises:
   selecting image information of at least one target point in the target area from the first initial media file;
   selecting image information of at least one target point in the target area from the second initial media file; and
   determining, according to the image information that is selected for the at least one target point in the target area from each of the first initial media file and the second initial media file, depth information corresponding to each of the at least one target point.

3. The method according to claim 2, wherein selecting the image information of at least one target point in the target area from the first initial media file and selecting the image information of at least one target point in the target area from the second initial media file comprises:
   dividing the target area into at least one target sub-area;
   obtaining a feature parameter corresponding to the at least one target sub-area, wherein the feature parameter is used to represent complexity of image information comprised in the target sub-area;
   determining, according to the feature parameter corresponding to the target sub-area, a quantity of target points selected for each target sub-area; and
   selecting image information of at least one target point from each target sub-area in each of the first initial media file and the second initial media file according to the quantity of target points selected for each target sub-area.

4. The method according to claim 1, wherein the calculating a second media file based on the first media file and the depth information comprises:
   obtaining the third location, wherein the third location is different from an acquisition location corresponding to the first media file; and
   calculating the second media file according to at least the first media file, the depth information, and the third location.

5. The method according to claim 1, further comprising:
   detecting a first display area that a user gazes at in each of the first media file and the second media file that are displayed by the first output unit and the second output unit,
   wherein the first media file and the second media file are displayed in a virtual reality (VR) scene, and the first output unit and the second output unit are configured to provide the VR scene;
   obtaining a depth of field, in a display interface of the wearable electronic device, of the first display area corresponding to each of the first media file and the second media file; and
   adjusting a display area definition in the display interface based on the depth of field, wherein a first display area has a higher display area definition than a second display area after the adjusting, and the second display area is all or some of areas other than the first display area in the display interface.

6. The method according to claim 5, wherein adjusting the display area definition in the display interface based on the depth of field comprises:
   determining a display area that is in the display interface of the media file and that has a depth of field different from a depth of field of the first display area, as the second display area; and
   setting the definition of the second display area in the display interface to be lower than the definition of the first display area.

7. The method according to claim 6, wherein the setting the definition of the second display area in the display interface to be lower than the definition of the first display area comprises:
   obtaining a depth of field of each display sub-area in the second display area;
   determining a depth difference between the depth of field of each display sub-area in the second display area and the depth of field of the first display area; and
   setting definitions of different display sub-areas according to the depth difference, wherein a larger depth difference corresponding to a display sub-area indicates a lower definition to be set for the display sub-area.

8. The method according to claim 6, wherein setting the definition of the second display area in the display interface to be lower than the definition of the first display area comprises:
   lowering definitions of display sub-areas that are centered on the first display area, in a predetermined radiation path, and in the second display area, wherein the predetermined radiation path is a radiation path far away from the first display area.

9. A wearable electronic device comprising:
   one or more processors;

memory coupled to the one or more processors; and
a plurality of computer executable instructions stored in the memory that, when executed by the one or more processors of the wearable electronic device, cause the wearable electronic device to:
  obtain a first initial media file and a second initial media file for a target area, the first initial media file including an image acquired based on a first location of the target area, and the second initial media file including an image acquired based on a second location of the target area;
  determine depth information of each target point in the target area based on the first initial media file and the second initial media file, determining the depth information includes calculating:
  a first angle between (i) a first line connecting a point in the first image and a point in the second image and (ii) a second line connecting the point in the first image and the target point in the target area; and
  a second angle between (i) the first line connecting the point in the first image and the point in the second image and (ii) a third line connecting the point in the second image and the target point in the target area; and
  select a first media file from the first initial media file and the second initial media file;
  calculate a second media file based on the first media file, the first angle, and the second angle, the calculated second media file representing an image for the target area that is acquired at a third location of the target area to control a first output unit and a second output unit to respectively output the first media file and the second media file.

10. The wearable electronic device according to claim 9, wherein the wearable electronic device is further configured to:
  select image information of at least one target point in the target area from the first initial media file;
  select image information of at least one target point in the target area from the second initial media file; and
  determine, according to the image information that is selected for the at least one target point in the target area from each of the first initial media file and the second initial media file, depth information corresponding to each of the at least one target point.

11. The wearable electronic device according to claim 10, wherein the wearable electronic device is further configured to:
  divide the target area into at least one target sub-area;
  obtain a feature parameter corresponding to the at least one target sub-area, wherein the feature parameter is used to represent complexity of image information comprised in the target sub-area;
  determine, according to the feature parameter corresponding to the target sub-area, a quantity of target points selected for each target sub-area; and
  select image information of at least one target point from each target sub-area in each of the first initial media file and the second initial media file according to the quantity of target points selected for each target sub-area.

12. The wearable electronic device according to claim 9, wherein the wearable electronic device is further configured to:
  obtain the third location, wherein the third location is different from an acquisition location corresponding to the first media file; and
  calculate the second media file according to at least the first media file, the depth information, and the third location.

13. The wearable electronic device according to claim 9, wherein the wearable electronic device is further configured to:
  detect a first display area that a user gazes at in each of the first media file and the second media file that are displayed by the first output unit and the second output unit, wherein the first media file and the second media file are displayed in a virtual reality (VR) scene, and the first output unit and the second output unit are configured to provide the VR scene;
  obtain a depth of field, in the display interface, of the first display area corresponding to each of the first media file and the second media file; and
  adjust a display area definition in a display interface of the wearable electronic device based on the depth of field, wherein a first display area has a higher display area definition than a second display area after adjustment, and the second display area is all or some of areas other than the first display area in the display interface.

14. The wearable electronic device according to claim 13, wherein the wearable electronic device is further configured to:
  determine a display area that is in the display interface of the media file and that has a depth of field different from a depth of field of the first display area, as the second display area; and
  set the definition of the second display area in the display interface to be lower than the definition of the first display area.

15. A non-transitory computer readable storage medium storing one or more programs for execution by one or more processors of a wearable electronic device, wherein the one or more programs, when executed by the one or more processors, cause the wearable electronic device to:
  obtain a first initial media file and a second initial media file for a target area, the first initial media file including a first image acquired based on a first location of the target area, and the second initial media file including a second image acquired based on a second location of the target area;
  determine depth information of each target point in the target area based on the first initial media file and the second initial media file, determining the depth information includes calculating:
  a first angle between (i) a first line connecting a point in the first image and a point in the second image and (ii) a second line connecting the point in the first image and the target point in the target area, and
  a second angle between (i) the first line connecting the point in the first image and the point in the second image and (ii) a third line connecting the point in the second image and the target point in the target area;
  select a first media file from the first initial media file and the second initial media file;
  calculate a second media file based on the first media file, the first angle, and the second angle, the calculated second media file representing an image for the target area that is acquired at a third location of the target area;
  output the first media file to a first output unit of the wearable electronic device; and
  output the calculated second media file to a second output unit of the wearable electronic device.

16. The computer readable storage medium according to claim 15, wherein the instructions to determine the depth information of one or more target point in the target area based on the first initial media file and the second initial media file for the target area further comprise instructions to:

select image information of at least one target point in the target area from the first initial media file;

select image information of at least one target point in the target area from the second initial media file; and determine, according to the image information that is selected for the at least one target point in the target area from each of the first initial media file and the second initial media file, depth information corresponding to each of the at least one target point.

17. The computer readable storage medium according to claim 16, wherein the instructions to select the image information of at least one target point in the target area from the first initial media file and selecting the image information of at least one target point in the target area from the second initial media file further comprise instructions to:

divide the target area into at least one target sub-area;

obtain feature parameter corresponding to the at least one target sub-area, wherein the feature parameter is used to represent complexity of image information comprised in the target sub-area;

determine, according to the feature parameter corresponding to the target sub-area, a quantity of target points selected for each target sub-area; and select image information of at least one target point from each target sub-area in each of the first initial media file and the second initial media file according to the quantity of target points selected for each target sub-area.

18. The computer readable storage medium according to claim 15, wherein the instructions to calculate a second media file based on the first media file and the depth information further comprise instructions to:

obtain the third location, wherein the third location is different from an acquisition location corresponding to the first media file; and calculate the second media file according to at least the first media file, the depth information, and the third location.

19. The computer readable storage medium according to claim 15, wherein the one or more programs further comprise instructions for:

detecting a first display area that a user gazes at in each of the first media file and the second media file that are displayed by the first output unit and the second output unit, wherein the first media file and the second media file are displayed in a virtual reality (VR) scene, and the first output unit and the second output unit are configured to provide the VR scene;

obtaining a depth of field, in a display interface of the wearable electronic device, of the first display area corresponding to each of the first media file and the second media file; and adjusting a display area definition in the display interface based on the depth of field, wherein a first display area has a higher display area definition than a second display area after the adjusting, and the second display area is all or some of areas other than the first display area in the display interface.

20. The computer readable storage medium according to claim 19, wherein the instructions to adjust the display area definition in the display interface based on the depth of field further comprise instructions to:

determine a display area that is in the display interface of the media file and that has a depth of field different from a depth of field of the first display area, as the second display area; and set the definition of the second display area in the display interface to be lower than the definition of the first display area.

* * * * *